United States Patent
Tseng et al.

(10) Patent No.: US 9,449,526 B1
(45) Date of Patent: Sep. 20, 2016

(54) GENERATING A GAME RELATED TO A DIGITAL WORK

(75) Inventors: Walter Manching Tseng, Bellevue, WA (US); Adam J. Iser, Mercer Island, WA (US); Michel L. Goldstein, Seattle, WA (US); Ravi Shankar Thangavel, Seattle, WA (US); Janna S. Hamaker, Seattle, WA (US); Ankur Jain, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 13/424,046

(22) Filed: Mar. 19, 2012

Related U.S. Application Data

(63) Continuation-in-part of application No. 13/246,759, filed on Sep. 27, 2011, now Pat. No. 8,842,085.

(60) Provisional application No. 61/538,715, filed on Sep. 23, 2011.

(51) Int. Cl.
*A63F 9/24* (2006.01)
*A63F 13/00* (2014.01)
(Continued)

(52) U.S. Cl.
CPC ......... *G09B 7/02* (2013.01); *A63F 2300/8064* (2013.01)

(58) Field of Classification Search
CPC G09B 7/02; A63F 2300/8064; A63F 3/0421
USPC .............. 463/9, 42; 434/177, 322
See application file for complete search history.

(56) References Cited

U.S. PATENT DOCUMENTS

D146,109 S  12/1946 Jones
5,251,125 A  10/1993 Karnowski et al.
(Continued)

FOREIGN PATENT DOCUMENTS

CN  101309323  11/2008
JP  2002508543  3/2002
(Continued)

OTHER PUBLICATIONS

Office action for U.S. Appl. No. 13/246,798, mailed on Jan. 3, 2013, Goodspeed et al., "Navigating Supplemental Information for a Digital Work", 27 pages.
(Continued)

*Primary Examiner* — Omkar Deodhar
*Assistant Examiner* — Wei Lee
(74) *Attorney, Agent, or Firm* — Lee & Hayes, PLLC

(57) ABSTRACT

In some implementations, one or more words from a digital work are used to generate a game to be displayed on an electronic device. For example, the electronic device may include a library of one or more digital works. A word or knowledge game may be dynamically generated based on objects, such as characters, topics, places, organizations, things, etc., identified in at least one digital work in the library. As one example, a crossword puzzle may be created to include words and clues based at least in part on the objects identified in at least one digital work and supplemental information associated with the objects. The clues for the crossword puzzle may be generated automatically based, at least in part, on a desired level of difficulty. Further, in some cases, the game may be generated from words drawn from multiple digital works in the library.

28 Claims, 17 Drawing Sheets

(51) Int. Cl.
| | | |
|---|---|---|
| G06F 17/00 | (2006.01) | |
| G06F 19/00 | (2011.01) | |
| A63F 9/00 | (2006.01) | |
| G09B 3/00 | (2006.01) | |
| G09B 7/02 | (2006.01) | |

(56) References Cited

U.S. PATENT DOCUMENTS

| | | | |
|---|---|---|---|
| 5,276,616 A | | 1/1994 | Kuga et al. |
| 5,339,391 A | | 8/1994 | Wroblewski et al. |
| 5,479,600 A | | 12/1995 | Wroblewski et al. |
| 5,636,350 A | | 6/1997 | Eick et al. |
| 5,644,692 A | | 7/1997 | Eick |
| 5,790,819 A | | 8/1998 | Rosenburg et al. |
| 5,820,386 A * | | 10/1998 | Sheppard, II ............... 434/322 |
| 5,838,323 A | | 11/1998 | Rose et al. |
| 5,845,288 A | | 12/1998 | Syeda-Mahmood |
| 5,867,158 A | | 2/1999 | Murasaki et al. |
| 5,873,107 A | | 2/1999 | Borovoy et al. |
| 6,073,148 A | | 6/2000 | Rowe et al. |
| 6,211,856 B1 | | 4/2001 | Choi et al. |
| 6,377,281 B1 | | 4/2002 | Rosenbluth et al. |
| 6,397,211 B1 | | 5/2002 | Cooper |
| 6,518,984 B1 | | 2/2003 | Maeckel et al. |
| 6,552,717 B2 | | 4/2003 | Mailman |
| 6,964,608 B1 * | | 11/2005 | Koza ............................... 463/9 |
| 7,234,942 B2 | | 6/2007 | Hu et al. |
| 7,310,084 B2 | | 12/2007 | Shitanaka et al. |
| 7,421,660 B2 | | 9/2008 | Charnock et al. |
| 7,689,933 B1 | | 3/2010 | Parsons |
| 7,716,224 B2 | | 5/2010 | Reztlaff, II et al. |
| 7,778,890 B1 | | 8/2010 | Bezos et al. |
| 7,793,230 B2 | | 9/2010 | Burns et al. |
| 7,836,408 B1 | | 11/2010 | Ollmann et al. |
| 7,881,957 B1 | | 2/2011 | Cohen et al. |
| 7,930,393 B1 | | 4/2011 | Baumback et al. |
| 7,970,897 B1 | | 6/2011 | Baumback et al. |
| 8,041,595 B2 | | 10/2011 | Robertson et al. |
| 8,051,385 B1 | | 11/2011 | Yawitz et al. |
| 8,065,626 B2 | | 11/2011 | Hoshino |
| 8,078,985 B2 | | 12/2011 | Sauermann |
| 8,090,724 B1 | | 1/2012 | Welch et al. |
| 8,115,769 B1 | | 2/2012 | Lymer et al. |
| 8,135,389 B2 | | 3/2012 | Forstall et al. |
| 8,150,695 B1 | | 4/2012 | Killalea et al. |
| 8,171,432 B2 | | 5/2012 | Matas et al. |
| D662,507 S | | 6/2012 | Mori et al. |
| 8,262,445 B1 * | | 9/2012 | Spigner ............................... 463/9 |
| 8,325,974 B1 | | 12/2012 | Killalea et al. |
| 8,589,399 B1 | | 11/2013 | Lee et al. |
| 8,635,531 B2 | | 1/2014 | Graham et al. |
| 8,842,085 B1 | | 9/2014 | Goodspeed et al. |
| 2002/0059285 A1 | | 5/2002 | Fukushima et al. |
| 2002/0093496 A1 | | 7/2002 | Gould |
| 2003/0009459 A1 * | | 1/2003 | Chastain et al. ................... 707/7 |
| 2003/0107178 A1 * | | 6/2003 | Weston ........................ 273/459 |
| 2003/0108854 A1 * | | 6/2003 | Chan ............................... 434/317 |
| 2003/0110162 A1 | | 6/2003 | Newman |
| 2003/0122873 A1 | | 7/2003 | Dieberger et al. |
| 2003/0139210 A1 * | | 7/2003 | Raben ............................... 463/9 |
| 2004/0029085 A1 | | 2/2004 | Hu et al. |
| 2004/0078190 A1 | | 4/2004 | Fass et al. |
| 2004/0095376 A1 | | 5/2004 | Graham et al. |
| 2005/0187910 A1 * | | 8/2005 | Kladko ............................... 707/3 |
| 2005/0283723 A1 | | 12/2005 | Fish |
| 2006/0047500 A1 | | 3/2006 | Humphreys et al. |
| 2007/0050712 A1 | | 3/2007 | Hull et al. |
| 2007/0192729 A1 | | 8/2007 | Downs |
| 2008/0039203 A1 * | | 2/2008 | Ackley et al. ................... 463/40 |
| 2008/0040665 A1 | | 2/2008 | Waldeck |
| 2008/0077583 A1 | | 3/2008 | Castro et al. |
| 2008/0134033 A1 | | 6/2008 | Burns et al. |
| 2008/0138034 A1 | | 6/2008 | Hiroi et al. |
| 2008/0140412 A1 * | | 6/2008 | Millman et al. ............. 704/270 |
| 2008/0163039 A1 | | 7/2008 | Ryan et al. |
| 2008/0235207 A1 | 9/2008 | Berkner et al. |
| 2008/0243828 A1 | 10/2008 | Reztlaff et al. |
| 2008/0294674 A1 | 11/2008 | Reztlaff, II et al. |
| 2009/0055394 A1 | 2/2009 | Schilit et al. |
| 2009/0099996 A1 | 4/2009 | Stefik |
| 2009/0204609 A1 | 8/2009 | Labrou et al. |
| 2009/0293019 A1 | 11/2009 | Raffel et al. |
| 2010/0076979 A1 | 3/2010 | Wang et al. |
| 2010/0145678 A1 | 6/2010 | Csomai et al. |
| 2010/0145687 A1 | 6/2010 | Huo et al. |
| 2010/0185689 A1 | 7/2010 | Hu et al. |
| 2010/0223292 A1 | 9/2010 | Bhagwan et al. |
| 2010/0268124 A1 | 10/2010 | Hamilton et al. |
| 2010/0299149 A1 | 11/2010 | Kurzweil et al. |
| 2011/0010617 A1 | 1/2011 | Kim et al. |
| 2011/0055691 A1 | 3/2011 | Carlen et al. |
| 2011/0087955 A1 * | 4/2011 | Ho et al. ........................ 715/230 |
| 2011/0105232 A1 * | 5/2011 | Godfrey et al. ................ 463/42 |
| 2011/0106807 A1 | 5/2011 | Srihari et al. |
| 2011/0167380 A1 | 7/2011 | Stallings et al. |
| 2011/0179344 A1 | 7/2011 | Paxson |
| 2011/0261030 A1 | 10/2011 | Bullock |
| 2011/0321071 A1 | 12/2011 | McRae |
| 2012/0078612 A1 | 3/2012 | Kandekar et al. |
| 2012/0078613 A1 | 3/2012 | Kandekar et al. |
| 2012/0079372 A1 | 3/2012 | Kandekar et al. |
| 2012/0079422 A1 | 3/2012 | Hoshino |
| 2012/0120078 A1 | 5/2012 | Hubbard |
| 2012/0124505 A1 | 5/2012 | St. Jacques, Jr. |
| 2012/0166414 A1 | 6/2012 | Decker et al. |
| 2012/0166634 A1 | 6/2012 | Baumback et al. |
| 2012/0173659 A1 | 7/2012 | Thaxter et al. |
| 2012/0179449 A1 | 7/2012 | Raskino et al. |
| 2013/0074133 A1 | 3/2013 | Hwang et al. |
| 2013/0124988 A1 | 5/2013 | Lettau |
| 2013/0151954 A1 | 6/2013 | Ierullo |

FOREIGN PATENT DOCUMENTS

| | | |
|---|---|---|
| JP | 2005063283 | 3/2005 |
| JP | 2005259088 | 9/2005 |
| JP | 2008148077 | 6/2008 |
| JP | 2009129009 | 6/2009 |
| JP | 2010511936 | 4/2010 |

OTHER PUBLICATIONS

The PCT Search Report mailed Nov. 20, 2012 for PCT application No. PCT/US12/56634, 7 pages.

Translated Japanese Office Action mailed Jun. 29, 2012 for Japanese design application No. 2011-23927, a counterpart foreign application of design U.S. Appl. No. 29/402,813, 3 pages.

Morse, "Document Visualization", at http://www.itl.nist.gov/iaui/vvrg/emorse/papers/soa/DocumentVisualization/htm, retrieved on Feb. 7, 2013, 2009, 39 pages.

Office action for U.S. Appl. No. 13/246,798, mailed on Jul. 18, 2013, Goodspeed et al., "Navigating Supplemental Information for a Digital Work", 31pages.

Office action for U.S. Appl. No. 13/246,796, mailed on Jul. 19, 2013, Goodspeed et al., "Providing Supplemental Information for a Digital Work in a User Interface", 26 pages.

Hearst, "Information Visualization for Search Interfaces", Cambridge University Press, Sep. 2009, 41 pages.

Office action for U.S. Appl. No. 13/246,796, mailed on Feb. 15, 2013, Goodspeed et al., "Providing Supplemental Information for a Digital Work in a User Interface", 21 pages.

The Canadian Office Action mailed Dec. 12, 2011 for Canadian design application No. 142736, a counterpart foreign application of design U.S. Appl. No. 29/402,813, 1 page.

The Korean Office Action mailed Jan. 2, 2012 for Korean design application No. 30-2011-46560, a counterpart foreign application of design U.S. Appl. No. 29/402,813, 2 pages.

Office Action for U.S. Appl. No. 13/246,759, mailed on Jan. 17, 2014, Joshua M. Goodspeed, "Providing Supplemental Information for a Digital Work", 11 pages.

(56) References Cited

OTHER PUBLICATIONS

The Indian Office Action mailed Aug. 14, 2014 for Indian design application No. 240305, a counterpart foreign application of design U.S. Pat. No. D. 674,810, 7 pages.
Office action for U.S. Appl. No. 13/246,798, mailed on Oct. 2, 2014, Goodspeed et al., "Navigating Supplemental Information for a Digital Work", 51 pages.
Final Office Action for U.S. Appl. No. 13/246,796, mailed on Jan. 15, 2015, Joshua M. Goodspeed, "Providing Supplemental Information for a Digital Work in a User Interface", 27 pages.
Office Action for U.S. Appl. No. 13/425,116, mailed on Nov. 17, 2014, Joshua M. Goodspeed, "Supplemental Information for a Digital Work", 17 pages.
Anastacio, et al., "Supervised Learning for Linking Named Entries to Knowledge Base Entries", Text Analysis Conference (TAC2011), , Nov. 14-15, 2011, pp. 1-12.
Coursey, et al., "Using Encyclopedic Knowledge for Automatic Topic Identification", Thirteenth Conference on Computational Natural Language Learning, CoNLL, 2009, pp. 210-218.
Han, et al., A Generative Entity-Mention Model for Linking Entities with Knowledge Base, Institute of Software, Chinese Academy Sciences, Beijing, China, 2011, pp. 945-954.
Translated Japanese Office Action mailed Mar. 31, 2015 for Japanese patent application No. 2014-532016, a counterpart foreign application of U.S. Appl. No. 13/246,773, 10 pages.
Mihalcea, et al., "Wikify!: Linking Documents to Encyclopedic Knowledge", CIKM '07, 2007, pp. 1-9.
Nguyen, et al., "Exploring Wikipedia and Text Features for Named Entity Disambiguation", Intelligent Information and Database Systems, 2010, vol. 5991, pp. 11-20.
Office Action for U.S. Appl. No. 13/433,028, mailed on Apr. 16, 2015, Joshua M. Goodspeed, "Identifying Topics in a Digital Work", 17 pages.
Final Office Action for U.S. Appl. No. 13/246,798, mailed on May 29, 2015, Joshua M. Goodspeed, "Navigating Supplemental Information for a Digital Work", 68 pages.
Schonhofen, "Identifying document topics using the Wikipedia category network", 2006 IEEE/WIC/ACM Internation Conference of Web Intelligence, 2006, pp. 471-480.
Office Action for U.S. Appl. No. 13/246,796, mailed on Mar. 27, 2014, Joshua M. Goodspeed, "Providing Supplemental Information for a Digital Work in a User Interface", 21 pages.

Office Action for U.S. Appl. No. 13/247,670, mailed on Dec. 17, 2014, Tiffany Yun, "Electronic Devices with Pressure-Sensitive Bezels", 32 pages.
Givon, "Extracting Information from Fiction", Master of Science Thesis, University of Edinburgh, 2006, pp. 1-138.
Office Action for U.S. Appl. No. 13/431,838, mailed on Feb. 13, 2015, Joshua M. Goodspeed, "Identifying Entities in a Digital Work", 21 pages.
Office Action for U.S. Appl. No. 13/246,773, mailed on Feb. 26, 2015, Joshua M. Goodspeed, "Visual Representation of Supplemental Information for a Digital Work", 22 pages.
Walkenbach, "Excel 2010 Bible", Wiley, Massachusettes, 2010, pp. 418, 482.
The Extended European Search Report mailed Jul. 15, 2015 for European patent application No. 12833911.6, 6 pages.
Office action for U.S. Appl. No. 13/425,116 mailed on Sep. 3, 2015, Goodspeed et al., "Supplemental Information for a Digital Work", 20 pages.
The Chinese Office Action mailed Jan. 14, 2016 for Chinese patent application No. 201280046482.3, a counterpart foreign application of U.S. Appl. No. 13/246,773.
Office action for U.S. Appl. No. 13/433,028, mailed on Dec. 4, 2015, Goodspeed et al., "Identifying Topics in a Digital Work", 38 pages.
Translated Japanese Office Action mailed Oct. 6, 2015 for Japanese patent application No. 2014-532016, a counterpart foreign application of U.S. Appl. No. 13/246,773, 7 pages.
Office action for U.S. Appl. No. 13/246,773mailed on Nov. 12, 2015, Goodspeed et al., "Visual Representation of Supplemental Information for a Digital Work", 23 pages.
Office action for U.S. Appl. No. 13/431,838 mailed on Nov. 13, 2015, Goodspeed, "Identifying Entities in a Digital Work", 43 pages.
Office action for U.S. Appl. No. 13/246,798 mailed on Nov. 4, 2015, Goodspeed et al., "Navigating Supplemental Information for a Digital Work", 59 pages.
Office action for U.S. Appl. No. 13/431,838, mailed on Mar. 10, 2016, Goodspeed et al., "Identifying Entities in a Digital Work", 42 pages.
Office action for U.S. Appl. No. 13/433,028, mailed on Mar. 31, 2016, Goodspeed et al., "Identifying Topics in a Digital Work", 44 pages.

* cited by examiner

1400 ⤴

GENERATING A GAME RELATED TO A DIGITAL WORK

CROSS-REFERENCE TO RELATED APPLICATIONS

This application is a continuation-in-part of, and claims priority to, U.S. patent application Ser. No. 13/246,759 filed Sep. 27, 2011. This application claims the benefit of U.S. Provisional Patent Application No. 61/538,715, filed Sep. 23, 2011. The above-listed applications are incorporated herein by reference in their entireties.

BACKGROUND

The continued proliferation of digital works has led to an increase in the availability of such works, as well as an increase in the availability of electronic devices and applications used for consuming these works. For instance, users consume digital works, such as electronic books (eBooks), digital videos, digital songs, digital images, and the like, on an assortment of electronic devices. As the number of digital works and devices for consuming digital works continues to increase, users are ever more interested in enhancing their experiences while consuming these works.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
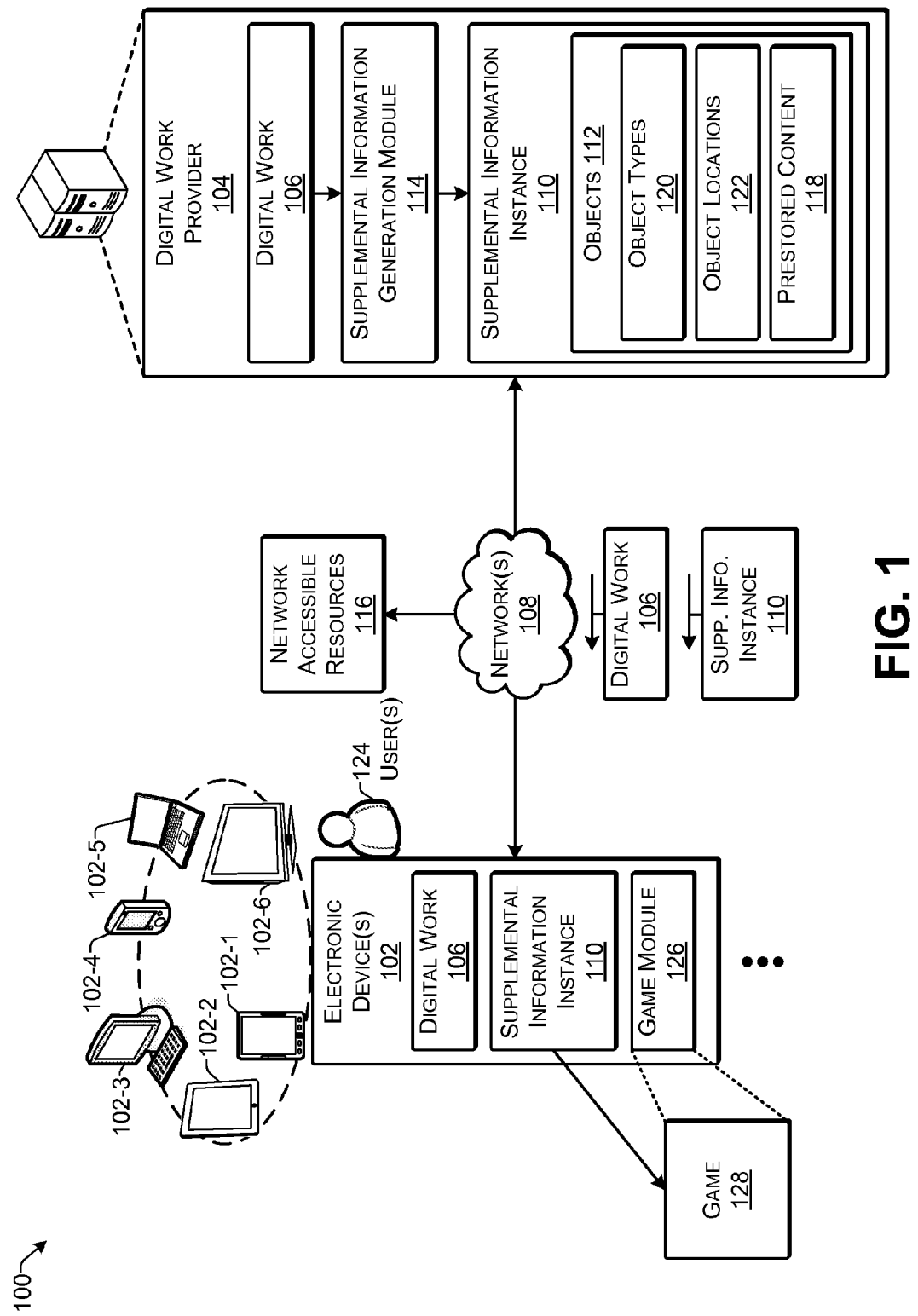
FIG. 1 illustrates an example system architecture for generating a game related to a digital work according to some implementations.

This disclosure includes techniques and arrangements for producing a game from one or more words in a digital work, such as a digital work that includes textual content or that has textual content associated therewith. For example, for a given digital work, implementations herein may dynamically generate, based on the content of the digital work, a game such as a crossword puzzle, an anagram game, a word-find game, a hangman game, a fill-in-the-blank game, as well as numerous other word or knowledge games, which may include variations of Scrabble®, Boggle®, Words with Friends®, and so forth. A game module may select information for inclusion in the game based, at least in part, on supplemental information for the digital work that identifies interesting entities or objects in the digital work, such as characters, places, organizations, topics, and the like.

As one example, an electronic device may present a particular digital work on a display of the electronic device. The electronic device may receive a user input to initiate a game, such as a crossword puzzle, on the electronic device. In response, a game module may access a supplemental information instance for the currently displayed digital work that contains or identifies a plurality of objects in the digital work. The game module may select a plurality of the objects in the supplemental information instance to use as answers to entries in the crossword puzzle. Determination of which objects to select may depend on a number of considerations, such as the number of objects identified in the supplemental information instance, the desired difficulty of the crossword puzzle, a frequency of occurrence of the objects in the digital work, a furthest point of progression of the user in the digital work, and so forth. The game module may employ a crossword layout generation algorithm to create a crossword puzzle that includes the selected objects as answers to entries in the crossword puzzle.

Furthermore, the game module may automatically generate clues for the answers in the crossword puzzle. The clues may also be derived, at least in part, from the supplemental information for the digital work. For example, the supplemental information may include prestored content for one or more of the objects that describes or is otherwise related to a particular object. Additionally, the supplemental information may include location information for each occurrence of each object. Thus, in some cases, the clues may be automatically drawn from the text in the digital work surrounding a selected occurrence of an object. Further, the game module may access popular highlight information that indicates which portion of a digital work has been highlighted by one or more readers or consumers of the digital work, and may use this information for determining a portion of the digital work from which to obtain a clue for a particular object having an occurrence that coincides with or is proximate to a popular highlight.

The generated crossword puzzle and corresponding clues may be displayed on the display of the electronic device. For example, if the user activates the game while reading a particular digital work, the game may be displayed as a pop-up or overlay on top of the presentation of the digital work. In such a case, the game may default to selecting objects from the particular digital work currently displayed on the electronic device. Alternatively, the user may activate a game independently of any digital work, such as by selecting a game application without having a digital work open on the device. In such a case, the game module may automatically select one or more digital works from which to generate the game, or the user may specify one or more digital works in a game initiation interface. For example, the game module may automatically select a digital work that the user has accessed most recently for generating the game based, at least in part, on the assumption that the digital work accessed most recently is the digital work that the user is currently reading or otherwise consuming. As another example, the user may have a number of digital works in the user's library, and the game module may identify a plurality of digital works in the user's library for generating a game across multiple digital works. For instance, the game module may identify a plurality of digital works that have a particular topic or subject in common, and may generate a game by drawing objects from the multiple digital works based on the particular topic. As another example, the game module may recognize a plurality of digital works that belong to the same series of books, and my draw objects for the game from multiple books in the series. Numerous other variations will be apparent to those of skill in the art in light of the disclosure herein.

A supplemental information instance may be generated in association with each digital work in the user's library. For example, a digital work provider may access and parse the text of a digital work to generate supplemental information for the digital work. In some instances, during initial processing of a digital work, the digital work provider may parse the text of the digital work into tokens corresponding to at least one of words or punctuation marks in the text. The text may be further parsed into annotations corresponding to noun phrases, verb phrases, other parts of speech, sentences, paragraphs, chapters, etc., which are each made up of one or more of the tokens. Location information may be associated with each token and/or annotation. As an example, the locations for the tokens may be determined based on an offset of each token from the beginning of the text of the digital work or other identified position in the text of the digital work. Additionally, or alternatively, the location of a token within a digital work may be identified or specified using other location identification techniques. For instance, the location of each token may be identified according to the coordinates of the token on a page, such as x-y coordinates of each token on a page or within an image. Further, the locations of the annotations, and thereby the objects, may be based, at least in part, on the locations of the tokens.

The digital work provider may further analyze the digital work to recognize one or more named entities within the digital work. One or more of the recognized named entities may be further selected or identified to become objects for which supplemental information is provided. The digital work provider may generate or obtain supplemental information corresponding to the one or more objects identified in the digital work. For example, the supplemental information for an object may include the location of each occurrence of the object in the digital work. Additionally, in some examples, the digital work provider may obtain content related to a particular object, such as content that describes or otherwise provides more information about the object. For instance, the content may be obtained from a suitable network accessible resource.

In some examples, the network accessible resource may be the Wikipedia® website (wikipedia.org), or a mirror site thereof, which is an example of a website that includes a plurality of interlinked entries on a plurality of different topics and subjects. Thus, the Wikipedia® website is an example of a network accessible resource that is searchable for a plurality of article entries on a plurality of topics, and is useful for identifying interesting objects in a digital work. Other examples of suitable network accessible resources may include Shelfari® (shelfari.com) and IMDb® (Internet Movie Database) (imdb.com), as well as other online encyclopedias, wikis, online dictionaries, and the like.

The supplemental information may include numerous different types of objects drawn from the text of a digital work that have supplemental information associated with them. As several non-exhaustive examples, an object be or may refer to a character in the digital work; a person mentioned in the digital work; a place mentioned in the digital work; a thing mentioned in the digital work; an interaction between characters in the digital work; an organization mentioned in the digital work; a relationship between characters in the digital work; a popular highlight in the digital work; a theme in the digital work; a scene in the digital work; an event mentioned in the digital work; a phrase used in the digital work; a topic mentioned in the digital work; a citation provided in the digital work; or a time period associated with the digital work. Accordingly, the game module may select any object included in the supplemental information for use in generating a game related to the digital work.

The digital work provider may generate a supplemental information instance having a structure that contains the supplemental information for a digital work. Further, as mentioned above, the digital work provider may obtain external content related to one or more objects identified in the digital work. For example, the external content may be obtained from one or more authoritative or generally trustworthy sources, such as one or more online sources of information. The digital work provider may include this content as prestored content included with the supplemental information for a corresponding digital work. Alternatively, one or more links or reference identifiers (e.g., hyperlinks, network location identifiers, uniform resource locators (URLs), etc.) for the content may be provided with the supplemental information in place of the prestored content or in addition to the prestored content to enable the game module to obtain the content dynamically over a network from a network location of a network accessible resource.

In some instances, the digital work provider may provide, or make available, a supplemental information instance to the electronic device when providing a corresponding digital work. For example, when the electronic device accesses or receives a digital work from the digital work provider, the corresponding supplemental information instance may be accessed or received as part of a package that includes the digital work. Thus, in the case that the digital work is downloaded from the digital work provider, the supplemental information may be downloaded by the electronic device contemporaneously with the digital work, such as before, during or after the download of the digital work. For example, the supplemental information instance for a particular digital work may be stored on the electronic device as metadata associated with a particular digital work. Consequently, in some cases, the supplemental information instance is stored on the electronic device separately from the corresponding digital work.

Alternatively, the supplemental information may not be provided to the electronic device with the digital work, but rather a reference identifier that identifies a network location of the supplemental information may be provided with the digital work. Accordingly, based on the reference identifier included with a particular digital work, the electronic device may access and obtain the supplemental information corresponding to the particular digital work under a number of different circumstances. For example, the electronic device may receive the supplemental information instance for a particular digital work when the particular digital work is received by the electronic device. In other examples, the electronic device may access or receive the supplemental information for the digital work when the digital work is first opened or displayed on the electronic device. As another example, the electronic device may access or receive the supplemental information in response to a user input to view the supplemental information, such as through selection of a particular object referenced in the digital work. In some cases, only a requested portion of the supplemental information is received by the electronic device, such as on an as-requested basis. In other cases, the electronic device receives a package or an entire instance of supplemental information prepared for the particular digital work so that the supplemental information may be subsequently accessed locally on the electronic device without further network access.

Furthermore, the digital work provider may provide updates to the supplemental information. For example, if the prestored content included with the supplemental information is updated or changed, the digital work provider or other entity may provide these updates or make these updates available to the electronic device. In some instances, a policy is applied to determine whether the prestored content has changed by a sufficient amount to warrant providing an update to the prestored content. Additionally, one or more links or reference identifiers (e.g., hyperlinks, network location identifiers, uniform resource locators (URLs) etc.) to online sources of information and content about the objects may be updated in the supplemental information, or new links may be added, through the provision of updated supplemental information. Similarly, when other aspects of the supplemental information change, the supplemental information on the electronic device may be updated with this changed information.

For discussion purposes, some example implementations are described in the environment of generating a crossword puzzle from content of one or more digital works. However, the implementations herein are not limited to the particular examples provided, and may be extended to generating numerous other games, and the like, as will be apparent to those of skill in the art in light of the disclosure herein.

Example Architecture

FIG. 1 illustrates an example architecture of a system 100 for dynamically generating a game related to one or more digital works according to some implementations. In some instances, the game is generated and displayed on one or more electronic devices 102. Some examples of electronic devices 102 may include digital media devices and eBook readers 102-1, tablet computing devices 102-2, desktop, terminal and workstation computing devices 102-3, smart phones and mobile devices 102-4, laptop and netbook computing devices 102-5, televisions, gaming systems and home electronic devices 102-6, and any other device capable of accessing and rendering digital works, online content, mobile content, or the like.

The electronic device 102 may communicate with a computing device of a digital work provider 104 to access or receive at least one digital work 106 over one or more networks 108. For example, the network(s) 108 may include a local area network (LAN), a wide area network (WAN), such as the Internet, or any combination thereof, and may include both wired and wireless communication technologies using any suitable protocols and communication techniques. The digital work provider 104 and the electronic device 102 may communicate and interact with one another using any combination of suitable communication and networking protocols, such as Internet protocol (IP), transmission control protocol (TCP), hypertext transfer protocol (HTTP), and so forth. In some cases, the electronic device 102 may download the digital work 106, while in other cases the digital work 106 may be streamed to the electronic device 102.

The digital work provider 104 may maintain an online location, such as a merchant website, an e-commerce site, or other functionality that offers one or more digital works 106 to the public. Alternatively, the digital work provider 104 may provide the digital work 106 to one or more electronic devices 102 through online or mobile applications (not shown in FIG. 1) executing on the electronic devices 102.

In some implementations, the digital work 106 may be an electronic book (eBook) having one or more pages of text. For example, the device 102 may be able to display the text of the eBook and also any illustrations, tables, maps, or graphic elements that might be contained in the eBook. The terms "book" and/or "eBook," as used herein, include electronic or digital representations of printed works, as well as digital content that may include text, multimedia, hypertext, and/or hypermedia. Examples of printed and/or digital works include, but are not limited to, books, magazines, newspapers, periodicals, journals, reference materials, textbooks, anthologies, instruction manuals, proceedings of meetings, forms, directories, web pages, plays, screen plays, closed captioning transcripts of movies and television shows, song lyrics, and so forth. Accordingly, the terms "book" and/or "eBook" may include any readable or viewable textual content that is in electronic or digital form. Additionally, some implementations herein are not limited to digital text, but may also include other digital works, such as digital audio (e.g., music, audible books, etc.), digital video (e.g., movies, television, short clips, etc.), images (e.g., art, photographs, etc.), and multi-media content, that may have text associated therewith, or from which text or words may be derived, such as from lyrics, screen plays, closed captioning transcripts, and so forth.

In some examples, the digital work provider 104 may generate a supplemental information instance 110 for a respective digital work 106 to provide information related to one or more terms, entities, or other objects 112 in the digital work 106. The digital work provider 104 may receive the digital work 106, such as from the publisher, author, or other source, and may process the digital work 106 to make the digital work 106 compatible with various display formats, device platforms, and so forth. The digital work provider 104 may further execute a supplemental information generation module 114, which may parse and analyze the digital work 106 to produce the supplemental information instance 110 that corresponds to the digital work 106. For example, the supplemental information generation module 114 may analyze the digital work 106 by identifying characters, people, things, phrases, places, organizations, topics, and other objects 112 in the digital work 106 that are of significance in the digital work 106. In some examples, the supplemental information generation module 114 may access various sources of information, such as network accessible resources 116 for assistance in identifying objects 112. Further, the supplemental information generation module 114 may perform statistical analysis and use statistical modeling to assist in identifying the significant objects 112 in the particular digital work 106. Thus, the supplemental information generation module 114 may identify entities in the digital work that are candidates to be made into objects 112, such as by identifying proper names, place names, statistically improbable phrases, and the like, in the text of the digital work 106. For instance, a statistically improbable phrase is a word or combination of words that occur in the text of a digital work one or more times in a manner or frequency that is outside of an expected threshold. If a particular phrase is used multiple times in a digital work, while not being used or being used rarely in a baseline of a large number of other digital works, this may indicate a statistically improbable phrase that is a candidate to become an object 112 of the digital work 106.

Additionally, to determine which candidate entities to make into objects 112, the supplemental information generation module 114 may access other sources of information outside of, or external to, the digital work 106. For example, the supplemental information generation module 114 may access the network accessible resources 116 that may include online sources of information, such as Wikipedia® (or a mirror thereof), Shelfari®, IMDb®, online wikis, dictionaries and encyclopedias, discussion forums, social networking sites, community sites, crowd-sourcing sites, or other online resources, which may provide information or clues to assist in performing identification of characters and other significant people, phrases, organizations, things, events, places, topics, etc., in the digital work 106. Further, the supplemental information generation module 114 may obtain additional information on the interesting terms or entities in the particular digital work 106, such as by obtaining definitions or other information for these terms or entities from various network locations, such as the authoritative sources mentioned above.

Further, if the digital work 106 is already in circulation, the supplemental information generation module 114 may access reader information, such as popular highlights or annotations made by readers of the digital work 106. For instance, the digital work provider may track which portions of a particular digital work 106 are commonly highlighted or annotated by readers of the digital work 106. Additionally, the supplemental information generation module 114 may access lists or databases of names for identifying proper names, nicknames, slang names, place names, and the like.

In addition to identification of the objects 112 in the digital work, the supplemental information generation module 114 may identify or obtain, from the network accessible resources 116, where available, excerpts of description, definitions, or other information related to identified objects 112 in the particular digital work 106. For example, the supplemental information generation module 114 may obtain content on an object 112, such as an excerpt from a Wikipedia® article, a Shelfari® or IMDb® listing, or the like, to include with the supplemental information instance 110 as prestored content 118 for the objects 112 identified in the particular digital work 106. In other examples, the supplemental information generation module 114 determines the network resource location of the content containing information about the object, and merely includes a reference identifier to the network location of the content, rather than providing the content itself, with the with supplemental information.

In addition, for each object 112, the supplemental information generation module 114 may identify an object type 120 and one or more object locations 122. For example, as described additionally below, each word in a digital work may be assigned a specific location, and the location may be used to identify the location of each occurrence of an object 112 identified in the digital work 106. Accordingly, every occurrence of an object 112 in the digital work 106 may be quickly located based on the designated object locations 122.

Further, when the objects 112 are identified, an object type 120 may be assigned to an object 112 based on various gathered information, such as whether a word is a proper noun, and usage of the word within the digital work 106, such as usage in connection with dialogue. Object type may further be determined in some cases on the presence of prefixes or suffixes, such as Mr., Ms., Junior, etc., and based in part on any external information obtained from the network accessible resources 116, lists of alternate names, nicknames, name databases, and the like. Accordingly, a large number of clues and indicators may be considered for determining whether a particular object 112 is a character, a place, an organization, a topic, a thing, or so forth.

When a user 124 of the electronic device 102 accesses, purchases or otherwise requests or obtains a particular digital work 106, such as through interaction with the digital work provider 104, the digital work provider 104 may make the particular digital work 106 available for delivery to the electronic device 102. The digital work provider 104 may also deliver, or make available for delivery, the corresponding supplemental information instance 110 for the particular digital work 106. For example, the particular digital work 106 and the corresponding supplemental information instance 110 may be downloaded contemporaneously from the digital work provider 104, e.g., as a package or as a sequential download. Alternatively, the digital work 106 and the corresponding supplemental information instance 110 may be provided to a third party, such as a wireless provider, that sends the digital work and the supplemental information instance 110 to the electronic device 102.

The electronic device 102 may include a game module 126 or may further receive the game module 126 from the digital work provider 104. The game module 126 may be a stand-alone game application, or may be one or more modules of another application, an operating system, a reader application, a digital-work-player application, or any other computer program or software able to be executed by the electronic device 102. Thus, in some examples, the user may activate the game module 126 independently as a distinct game application, while in other examples, the user may activate the game module 126 from within another application, such as while reading, viewing or playing a digital work.

The game module 126 may generate a game 128 from information contained in or derived from a digital work 106. For instance, the game module 126 may access the supplemental information instance 110 for a particular digital work 106 to obtain information related to the digital work to use for generating the game 128. As one illustrative example, suppose that the digital work 106 is an eBook, and that the user 104 is reading the digital work 106 on the electronic device 102. While reading the digital work 106, the user decides to play a game, such as a crossword puzzle. The user may make a user input or may otherwise activate a control to initiate the game module 126 for dynamically generating the game 128. The game module 126 may access the supplemental information instance 110 for the digital work 106 that the user 124 is currently reading to obtain information for generating the game 128. The game module 126 may display the crossword puzzle (or other requested game) as a pop-up or overlay displayed overtop of the presentation of the digital work 106. Alternatively, the game may be displayed in a separate full-screen window or interface, and the presentation of the digital work 106 may be closed or otherwise not viewable.

As another variation, if there are multiple digital works 106 in the user's library, the game module 126 may request that the user specify one or more digital works to be used for generating the game 128. Alternatively, the game module 126 may be set to select one or more digital works at random for generating the game 128. Still alternatively, rather than initiating the game module 126 from within an application that is displaying the digital work 106, the user 124 may initiate the game by activating the game module 126 as a separate game application on the electronic device 102. For example, the game module 126 may default to generating the game from a most-recently-accessed digital work 106. Alternatively, the game module 126 may present an interface to the user to enable the user to select one or more digital works from which the game 128 is to be generated. Numerous other variations will be apparent to those of skill in the art in view of the disclosure herein.

Example Framework for Generating a Game

Figure 2:
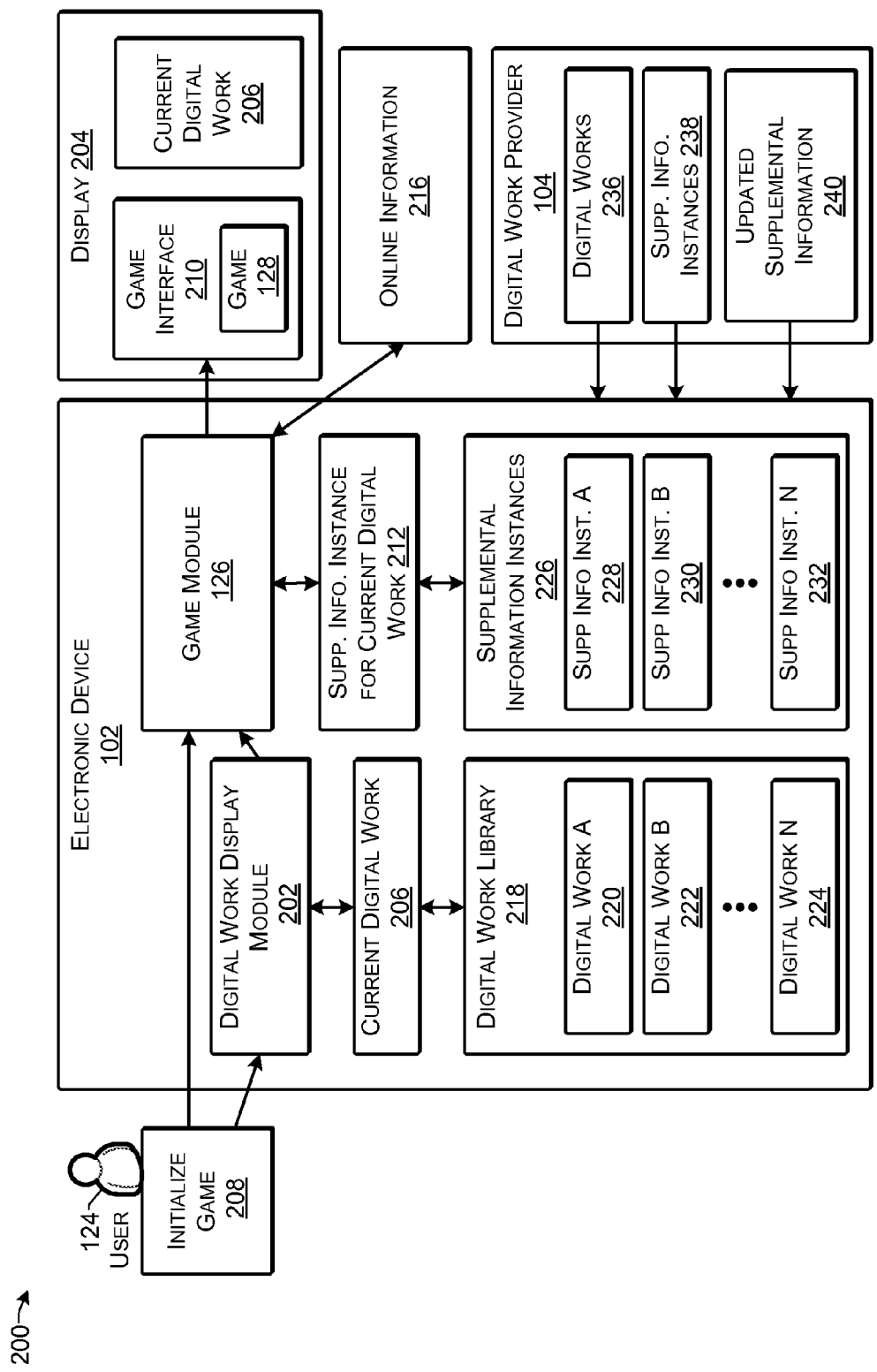
FIG. 2 illustrates an example framework for generating a game in connection with one or more digital works according to some implementations.

FIG. 2 illustrates an example framework 200 for generating and displaying a game 128 in connection with a digital work according to some implementations. In the example of FIG. 2, the electronic device 102 includes a digital work display module 202 and a display 204 for displaying the digital work 106 to a user. In some examples, the display 204 may be a touchscreen type of display configured with a sensor to sense a touch input received from an input effecter, such as a finger of a user, a stylus, or other pointer. Thus, the touchscreen may receive one or more touch inputs, interactions, selections of displayed objects, page swipes and so forth. In other examples, the display 204 may be non-touch sensitive. Accordingly, in addition to, or as an alternative to, a touch sensitive display, the electronic device 102 may include various external controls and input devices (not shown in FIG. 2). For example, some implementations of the electronic device 102 may include a virtual or physical keyboard, a mouse, a pointing stick, a touchpad, a trackball, a joystick, a remote control, buttons and/or various other controls for performing various desired inputs and interactions with the electronic device 102 and digital work 106 displayed on the display 204. Additionally, in some implementations, one or more voice commands may be used to control or interact with the digital works and interfaces herein, such as for selection of objects and performing other functions. Thus, implementations herein are not limited to any type of input devices, techniques, or controls.

Further, the electronic device 102 may include the game module 126 discussed above for generating the game 128. In some implementations, the digital work display module 202 and the game module 126 may be separate modules or applications. In other implementations, the digital work display module 202 and the game module 126 may both be part of the same application or computer program for displaying content on the electronic device 102. In yet other implementations, the digital work display module 202 and the game module 126 may represent different functionalities of the same module.

As one example, the digital work display module 202 may display a current digital work 206 on the display 204. In some examples, the display 204 may be part of the electronic device 102, and/or unitary with the electronic device 102. In other examples, the display 204 may be separate from the electronic device 102 and connected to or coupled with the electronic device 102. In any case, the digital work display module 202 may render the current digital work 206 on the display 204 for viewing by a user 124.

As one example, while the digital work display module 202 is displaying the current digital work 206, the electronic device 102 may receive a user selection 208 to activate a game, such as for generating and display the game 128 in a game interface 210. In response, in some implementations, the game module 126 may be executed to generate the game 128 in connection with the current digital work 206. The game module 126 may identify the current digital work 206, and may access the supplemental information instance 212 for the current digital work 206. In some examples, the supplemental information instance 212 may correspond to the supplemental information instance 110 described above. For example, the game module 126 may access the supplemental information instance 212 available for the current digital work 206, and may use the information contained therein to generate the game 128. The game 128 may be rendered on the display 204 in the game interface 210, such as in a window, overlay, pop up, or other game interface displayed on the display 204.

Additionally, in some implementations, the game module 126 may access online information 216 when generating the game 128. For example, if the supplemental information instance 212 links directly to a network resource, a portion of the information used for generating the game 128 may be obtained from online information 216, such as by reference to a uniform resource locator (URL), or other network location or repository. Examples of sources of such online information 216 include, but are not limited to Wikipedia®, Shelfari®, and IMDb®, as well as numerous other online sources, as discussed above. Accordingly, in some instances, the game module 126 may dynamically obtain information about a particular object to be used in the game 128 from one or more online sources of information or other network accessible resources when a resource locator is included in the supplemental information instance 212.

In some examples, the electronic device 102 may include a digital work library 218, which may include one or more digital works, such as a digital work A 220, a digital work B 222, . . . , a digital work N 224, and so forth. The electronic device 102 may also include supplemental information instances 226, which may include supplemental information corresponding to the digital works in the digital work library 218, and which may also correspond to the supplemental information instance 110 described above. In some implementations, a separate instance of supplemental information may be provided for each digital work 220-224. Accordingly, supplemental information instance A 228 may correspond to the digital work A 220, supplemental information instance B 230 may correspond to the digital work B 222, . . . , supplemental information instance N 232 may correspond to the digital work N 224, and so on. For example, the supplemental information instance A 228 may have been received by the electronic device 102 in connection with the accessing or downloading of the digital work A 220, such as from the digital work provider 104. Thus, the digital work provider 104 may provide digital works 236 and corresponding supplemental information instances 238 for each digital work 236 to a plurality of electronic devices 102 of a plurality of users 124.

Additionally, in some implementations, the digital work provider 104 may provide the digital work and corresponding supplemental information to an intermediary, such as a wireless network provider (not shown), or the like, that, in turn, provides the digital work and corresponding supplemental information to particular electronic devices 102. For purposes of this disclosure, "providing" or "making available" by the digital work provider may include any intermediaries that perform delivery of the digital works and/or supplemental information.

In addition, the digital work provider 104 may provide updated supplemental information 240 to the electronic device 102 on a one-time or periodic basis. For example, the supplemental information for one or more digital works stored on the electronic device 102 may include prestored content that provides information on one or more objects in the digital work. Such prestored content may be updated at the original source, and thus, the digital work provider 104 may provide updated supplemental information 240 to the electronic device 102 to reflect the change or the update made at the original source. Furthermore, other portions of the supplemental information may also change over time. For example, as new digital works are produced, objects in previous digital works may be discussed, used or referenced in the new digital works. Thus, in some examples, the supplemental information for existing digital works may be updated to include references to, or instances of, objects in newer digital works. Various other types of updates to the supplemental information may be provided by the digital work provider 104, with the foregoing being just several examples. In addition, in some implementations, a supplemental information display module (not shown in FIG. 2) on the electronic device 102 may independently seek out and obtain updates to the supplemental information, such as from the digital work provider and/or other online sources.

To control the frequency of updates to the supplemental information, the digital work provider 104 may apply one or more policies to determine whether changes to the prestored content, the reference identifiers, or other supplemental information are significant enough to warrant the distribution of updated supplemental content. For example, with respect to the prestored content, the digital work provider 104 may determine whether the content has been changed by a predetermined threshold amount. The digital work provider 104 may also consider other factors associated with the prestored content and the source of the prestored content, such as whether the source of the prestored content indicates that an error in the content has been corrected. Further, with respect to other types of updates to the supplemental information, various thresholds or policies may be similarly applied to determine whether to provide an update to the supplemental information for a particular digital work.

Additionally, in some implementations, crowd sourcing may be used to assist in correcting errors in alternate names, locations of objects in a digital work, identification of characters, and other automated decisions. For example, users may be provided the opportunity to correct or augment the supplemental information. In some instances, the author of the digital work may also be provided the opportunity to provide information regarding alternate names and other information, such as selection of significant phrases, locations of occurrences of particular objects, identification of scenes, and the like, depending on the nature of the digital work. These types of updates may also be provided as the updated supplemental information 240.

Example Interfaces

Figure 3:
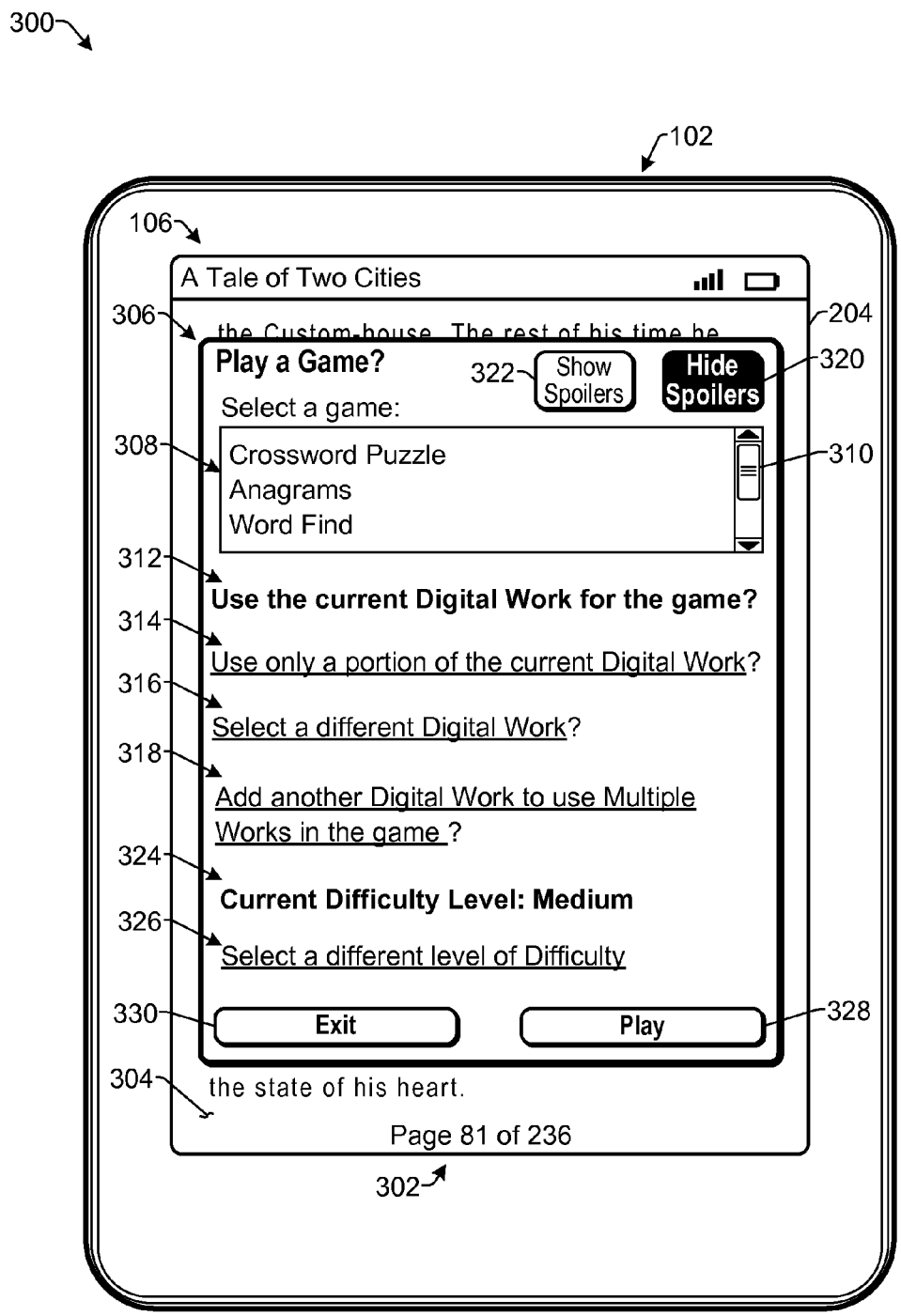
FIG. 3 illustrates an example user interface for starting a game according to some implementations.

FIG. 3 illustrates an example of a user interface 300 that may be presented to the user for selection and initiation of a game on the electronic device 102 according to some implementations. In this example, suppose that a digital work 106 that the user is currently reading is Charles Dickens' *A Tale of Two Cities*, and that the user has progressed to page 81 of 236 pages, as indicated by page number 302 at the bottom of a displayed page 304. For instance, the user may have activated a control to initiate playing a game, or as another example, an invitation to play a game may be automatically displayed by the electronic device 102 on a periodic basis. Furthermore, while in this example the user interface 300 is a pop-up window displayed overtop of the presentation of the digital work 106, in other examples, the user interface 300 may be displayed as a separate full-screen window, and further may be initiated from a separate application, rather than from within an application displaying the digital work 106.

The user interface 300 may include a pop-up window 306 displayed on the display 204 that invites the user to select a game to be played, as indicated at 308, such as a crossword puzzle, an anagram game, a word-find game, any of the other various games mentioned herein, other word games, knowledge games, trivia games, and so forth. Furthermore, a slider bar 310 may be provided to enable the user to scroll down to select additional games. Additionally, as indicated at 312, the user may also be provided with the opportunity to use the current digital work 106 for generating the game. For example, the game module 126 may default to generating the game from the currently displayed digital work. Alternatively, the user may be provided the option to select only a portion of the digital work, as indicated at 314, select a different digital work, as indicated at 316 and/or add another digital work for generating the game, as indicated at 318. For example, if the user has a plurality of digital works maintained in the user's digital work library, the game may be generated using one of the other digital works, other than the currently open digital work. Accordingly, if the user desires to select a different digital work, the user may select the link 314 to view other digital works that are available in the user's library for generating the game. Alternatively, the game may be generated using the current digital work as well as one or more additional digital works selected by the user or selected by the game module. Thus, the user may select the link 318 to view other digital works that may be combined with the current digital work for generating the game.

As another example, in the case of a digital work, such as a text book, in which each chapter covers a different subject, the user may select the link 314 to instruct the game module to generate the game based on content that is limited to a particular chapter, several chapters, or other designated portion(s) of the digital work, such as a range of pages. Thus, the user may thereby limit the game to a particular subject covered by the selected chapter or other selected portion of the digital work.

Additionally, in the illustrated example, the user is provided the option to turn spoilers on or off, as indicated by the "hide spoilers" button 320 and the "show spoilers" button 322. For instance, if the user has already read the digital work 106 before, the user may not care whether or not the answers, clues and hints selected for the game come from a later point in the digital work. On the other hand, typically, the user may not want to receive answers, clues and hints for characters, places, etc., that the user has not yet read about. Accordingly, the game module 126 may default to hiding spoilers, as indicated by the highlighting of the "hide spoilers" button 320, while providing the user with the option to generate the game from the entire digital work 322 by selecting the "show spoilers" button 322. For instance, in the example of FIG. 3, the user's furthest point of progression in the digital work is page 81. Therefore, the game module may default to generating the answers, clues and hints for the game only from content in the digital work that occurs from the beginning of the work, through page 81. Other variations will also be apparent to those of skill in the art in light of the disclosure herein.

Furthermore, the interface 300 may enable the user to select a desired level of difficulty. For example, the interface 300 may display a current level of difficulty 324, and if the currently selected level of difficulty 324 is not desired then, as indicated at 326, the user may select a link to select a different level of difficulty. Accordingly, based on the level of difficulty selected by the user, the game module may select different types of clues and/or different objects to be answers in the game. For example, the answers may be selected based on a frequency of occurrence in the digital work. Thus, more frequently occurring objects may be considered generally to be more easily identified by players of a game, while less frequently occurring objects may be more difficult to identify. Furthermore, if two or more objects in the digital work have similar names, then including one or more of those objects in the game may increase the level difficulty due to the difficulty in distinguishing the similar names.

Additionally, with respect to a crossword puzzle, or other games that provide clues or hints, the difficulty of the game may also depend on the clues or hints selected for each of the answers. For instance, in some cases, clues or hints may be selected in association with popular highlights for the digital work. Determining popular highlights may include aggregating highlights made to the digital work by a plurality of users to determine which portions of the digital work are highlighted most frequently by the plurality of users. Accordingly, clues selected from portions of the digital work that are popular highlights may be considered to make an answer to a crossword puzzle easier to solve him than clues selected from portions of the digital work that are not popular highlights, and thus, more obscure. Furthermore, other sources may also be employed for generating clues or hints for a crossword puzzle, such as by accessing information provided by users of a community or social website, such as Shelfari®, that allows users to enter information about particular characters, places, topics, or other objects identified in a particular digital work. In addition, when the Wikipedia® website has information related to an object, the information from the Wikipedia® website, or a mirror thereof, may be accessed by the game module to obtain clues or hints for the crossword puzzle.

When the user has selected the desired game, one or more digital works, or portions thereof, for generating the game, and a desired level of difficulty, the user may select a play button 328 to initiate generation of the game in connection with the selected digital work(s). On the other hand, if the user decides not to play a game at this time, the user may select the exit button 330 and return to reading the currently displayed digital work 106.

In some examples, the user interface 300, as well as the other user interfaces described herein, may be generated using any of HTML (hypertext markup language), JavaScript®, CSS (Cascading Style Sheets), widgets, or any combination thereof, or any other suitable technology. For instance, as defined by the World Wide Web Consortium (W3C), a widget is an interactive single purpose application for displaying and/or updating local data or data from the Web, which may be packaged in a way to allow a single download and installation on a user's computing device, a mobile device, or the like. A widget may run as a stand-alone application, i.e., is able to run outside of a web browser, and the runtime environment in which a widget is run may be referred to as a widget user agent. A widget user agent may be specifically enabled for running widgets, or a more generic user agent (e.g., a web browser or other application) may run a widget. See, e.g., W3C.org, Working Group Note 27 Sep. 2011 for additional description of widgets. The W3C is an international community that develops open standards for use on the World Wide Web. Further, widgets, HTML, JavaScript®, and CSS are just several examples of technologies for generating the user interface 300 and the other interfaces described below, and numerous other possible techniques, tools, functionalities, programming technologies, and the like will be apparent to those of skill in the art in light of the disclosure herein.

Figure 4:
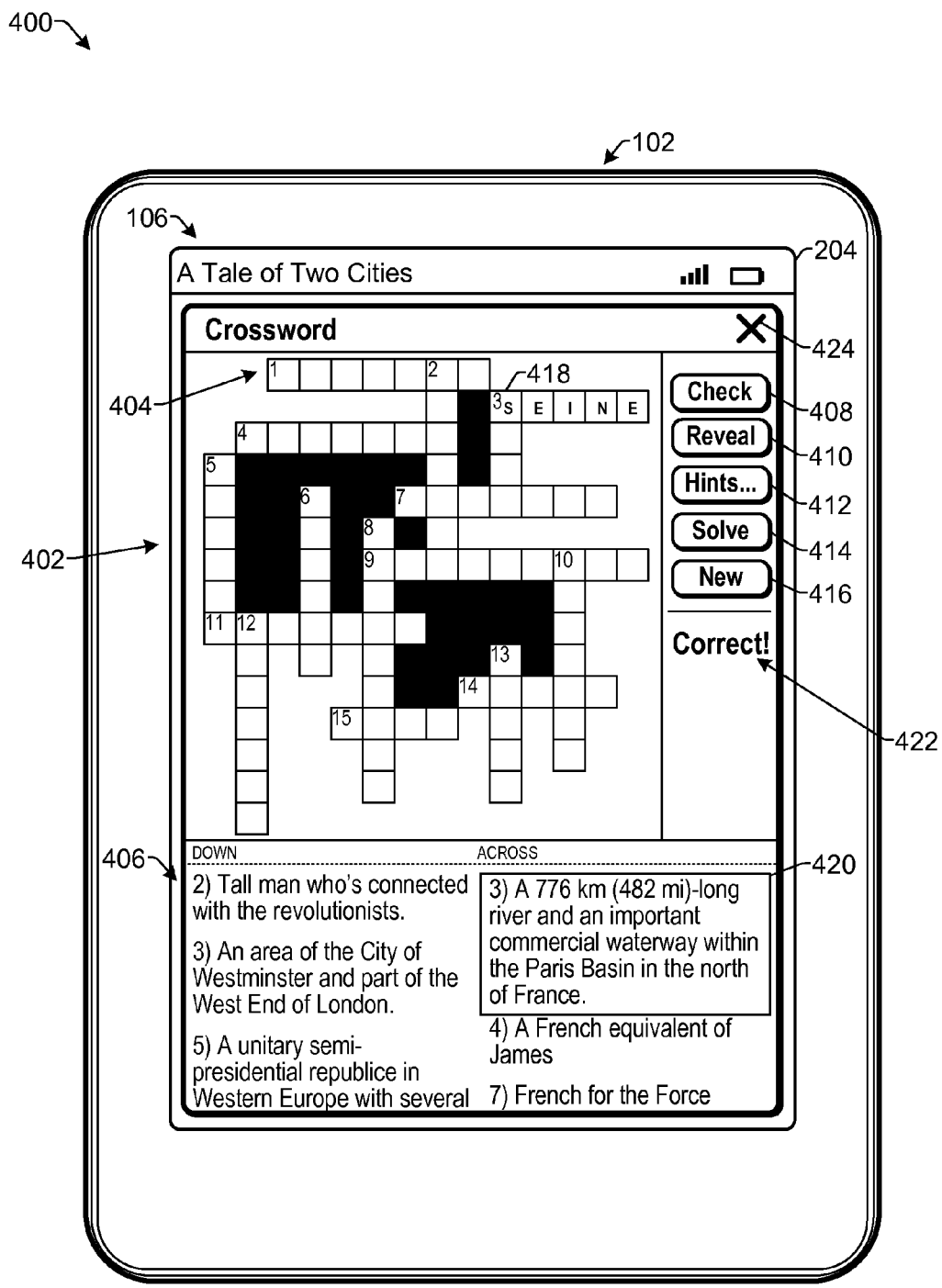
FIG. 4 illustrates an example game interface for a crossword puzzle game according to some implementations.

FIG. 4 illustrates an example game interface 400 that may be displayed on the display 204 to provide a game 402 according to some implementations herein. In this example, the game 402 is a crossword puzzle including a plurality of answers or entries 404 that may be filled in by the user based, at least in part, on a plurality of clues 406 also displayed in the game interface 400. As mentioned above, the answers to the entries 404 may be selected from objects in the supplemental information instance 110 for at least one digital work 106. For example, suppose that the user elected to have the game 402 generated in connection with the digital work 106 currently presented on the display 204 of the device 102, i.e., *A Tale of Two Cities* in this example. Accordingly, the game module may access the supplemental information instance 110 for *A Tale of Two Cities*, and select a plurality of objects 112 from the supplemental information instance 110 to use for generating the game 402.

In some examples, the game module 126 may determine a point of furthest progression in the digital work for the user. For instance, as illustrated in FIG. 3, the user progressed to page 81 of 236 pages and then the user activated the game initiation interface 300. Consequently, in order to avoid giving away details of what happens later in the book that may spoil the enjoyment of the book for the reader, the game module 126, when selecting objects for inclusion in the game, may limit the objects selected based on the point of furthest progression of the user. For example, the game module may determine, from the supplemental information instance, the location of each occurrence of each of the objects included in the supplemental information instance. Accordingly, the game module may select objects from only those objects that have a location of occurrence prior to the point of furthest progression of the user, and the game module may not select any objects whose location of first occurrence is after the point of furthest progression of the user. Alternatively, if the user selects the option to show spoilers, as discussed above with reference to FIG. 3, then the objects and other game information may be taken from throughout the digital work.

When determining objects to include in the game, the game module may sort the objects based on frequency of occurrence in the digital work, if the objects are not already sorted in such a manner, to enable determination of which objects to use for a desired level of difficulty. For example, for an increased level of difficulty, as mentioned above, the game module may select a larger number of less frequently occurring objects. Additionally, the difficulty of a crossword puzzle may also be related to the number of answers or entries to be included in the crossword puzzle (e.g., typically ranging from 15-130 entries). Consequently, the game module may select the number of objects corresponding to a desired level of difficulty and then construct the puzzle layout from the selected objects. Furthermore, when constructing the crossword puzzle layout, the density of the words may also affect the difficulty of the puzzle. For example, a denser puzzle in which more of the words cross each other may typically be easier to solve than a less dense puzzle.

In the case of a crossword puzzle or other game that utilizes clues or hints, the game module also automatically generates a plurality of clues 406 that correspond to the entries 404. The clues 406 selected by the game module may vary based upon the selected level of difficulty selected by the user. For example, if a higher level of difficulty is selected by a user, the clues may be more obscure or drawn from different portions of the digital work and/or the pre-stored content included in the supplemental information instance 110. Furthermore, the game module may automatically check to ensure that the clues 406 do not include the actual entry answer or variations thereof. For example, as discussed below, alternate names may be identified for characters, places, organizations, and other objects, in the supplemental information instance for each digital work. Accordingly, when selecting clues, the alternate names for an answer may be checked to ensure that a selected clue does not also include the answer or an obvious variation of the answer.

The interface 400 may further include a number of controls that can be used during play of the game. For example, the controls may include a check button 408, a reveal button 410, a hints button 412, a solve button 414, and a new button 416. For example, in the case that the display 204 is a touchscreen, suppose that the user has entered the word "Seine" into the entry "3 across" 418. The corresponding clue 420 may be highlighted when the user selects the entry 418, or vice versa. For instance, when a user taps on, or otherwise selects an entry, the clue for that entry may be displayed, highlighted, etc. After the user has entered an answer into an entry 404, the user may select the check button 408 and if the entry 418 is correct, this may be indicated at 422. As another example, when the user selects the check button 408, any incorrect entries may be outlined, highlighted, or otherwise distinguished. Furthermore, the reveal button 410 may be selected to display a particular answer for a particular selected entry. The hints button 412 may be selected to display a hint such as an alternate or additional clue for a particular entry. Alternatively, selection of the hints button 412 may result in display of one or more letters that are contained in a selected entry. The solve button 414 may be selected to show all the answers in the crossword puzzle 402.

The new button 416 may be selected to generate a new crossword puzzle. In some examples, selection of the new button 416 may result in presentation of the user interface 300 to enable the user to select a new game. In other examples, the selection of the new button 416 may immediately generate another crossword puzzle from the same digital work(s) at the same level of difficulty. When a new game is generated in connection with the same digital work(s), the game module may select at least some different objects to include in the new game. For instance, the game module may track the answers and/or clues used for a particular digital work, and may select at least some different objects and clues when generating another game for the same digital work. For example, if one or more of the same objects are selected for the new puzzle, then different clues may be selected.

In addition, the user may close the game 402 such as by tapping on the "X" 424. Closing the game 402 may provide the user with an opportunity to save the game for completion at a later point in time. Furthermore, the game 402 and the user's progress in the game 402 may be synchronized with other devices 102 of the user that also include the game module and/or the ability to display digital works. For example, a file including game information with the user's progress in the game may be transferred from the electronic device 102 to the digital work provider 104 or other service to enable synchronization with other devices 102 of the user that are registered with the digital work provider 104. Further, in some cases, the amount of time the user spends on the game may be tracked to determine the total amount of time to solve the game 402. The time information may be aggregated across multiple users to assist in determining difficulty of clues, puzzle arrangements, and so forth. As discussed additionally below, this information and other collected game information may be used to improve and/or refined the game module.

Figure 5A:
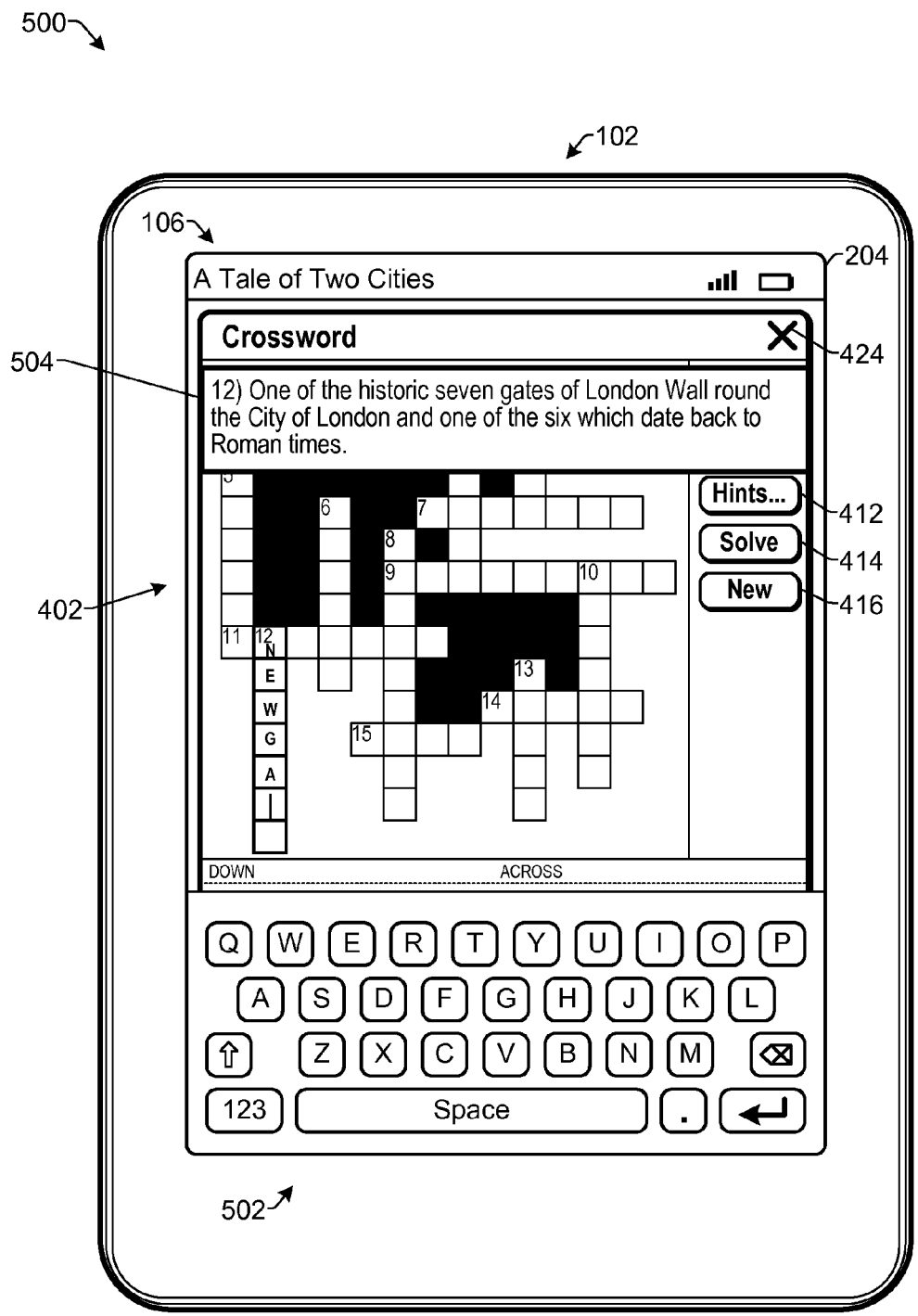
FIG. 5A illustrates an example text entry game interface according to some implementations.

FIG. 5A illustrates an example text entry user interface 500 for entering text into the crossword game 402 or other games displayed in the interface 500. For example, suppose that the user has selected the entry "12 down," such as by tapping or otherwise selecting the entry, for entering text into the entry. A touchscreen keyboard 502 may be presented over a portion of the display 102 to enable the user to enter text into the entry 12 down. Furthermore, the example of FIG. 5A illustrates that the clue 504 for the entry "12 down" may be displayed in an alternative location so that the user may still refer to the clue 504 while entering the answer after selecting the "12 down" entry. When the user has completed entering the text into the entry "12 down," the user may tap elsewhere on the display 102, or may otherwise close the keyboard 502, to have the keyboard 502 hidden until the user desires to add text to another entry. Furthermore, while examples herein are described in the environment of a touchscreen, it will be apparent to those of skill in the art that numerous other types of input controls may be used to effectuate similar or equivalent operations.

Figure 5B:
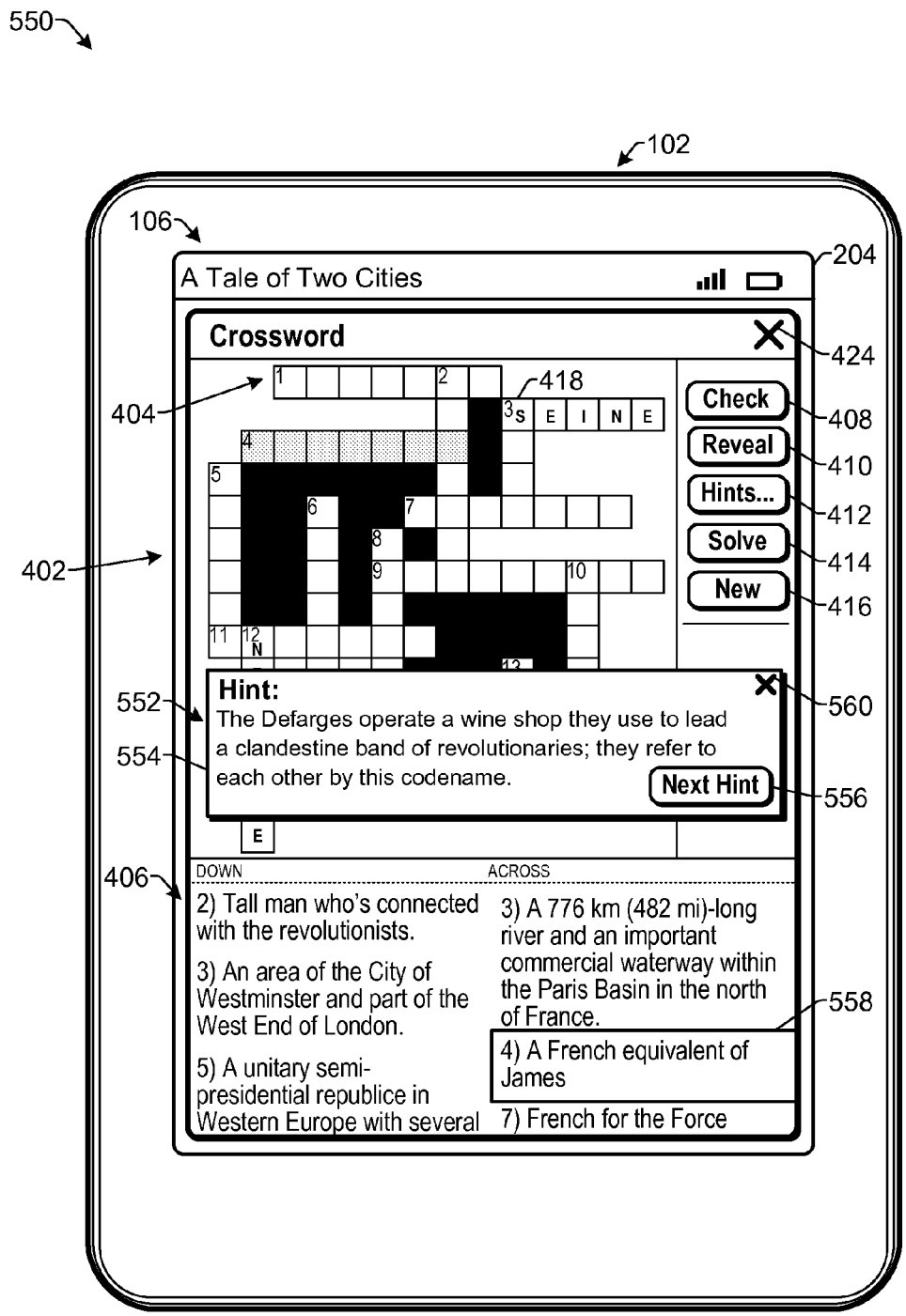
FIG. 5B illustrates an example hint interface for the crossword puzzle game of FIG. 4 according to some implementations.

FIG. 5B illustrates an example game interface 550 that may be displayed on the display 204 to provide a hint 552 according to some implementations herein. In this example, the user has selected the entry "4 across," and also selected the hints button 412 (or vice versa) to display a hint related to the entry "4 across." In this example, the hint 552 is displayed in a box or window 554 overlaid on the game 402, however, other suitable techniques for displaying the hint 552 may also be employed. For example, the hints may be displayed in the same window or a similar window as the clue 504 in the text entry interface 500 described above.

The hint window 554 may further include a "next hint" button 556, which the user may select to view one or more additional hints. As mentioned above, the hints may be generated in a manner similar to the clues for the game 402, such as by selection from the text of the digital work or from the other sources discussed above. Furthermore, upon the selection of entry "4 across," the corresponding clue 558 may also be highlighted, outlined, or otherwise emphasized. Or, in opposite order, upon selection of the clue 558, the entry "4 across" may be highlighted, shaded, or otherwise emphasized. Accordingly, in some cases, the user may select the clue 558 and then select the hints button 412 to view a hint (or vice versa), rather than selecting the entry "4 across" in the puzzle itself. When the user has finished viewing the hint 552, the user may close the hint window 554, such as by selecting an "X" 560.

Figure 6:
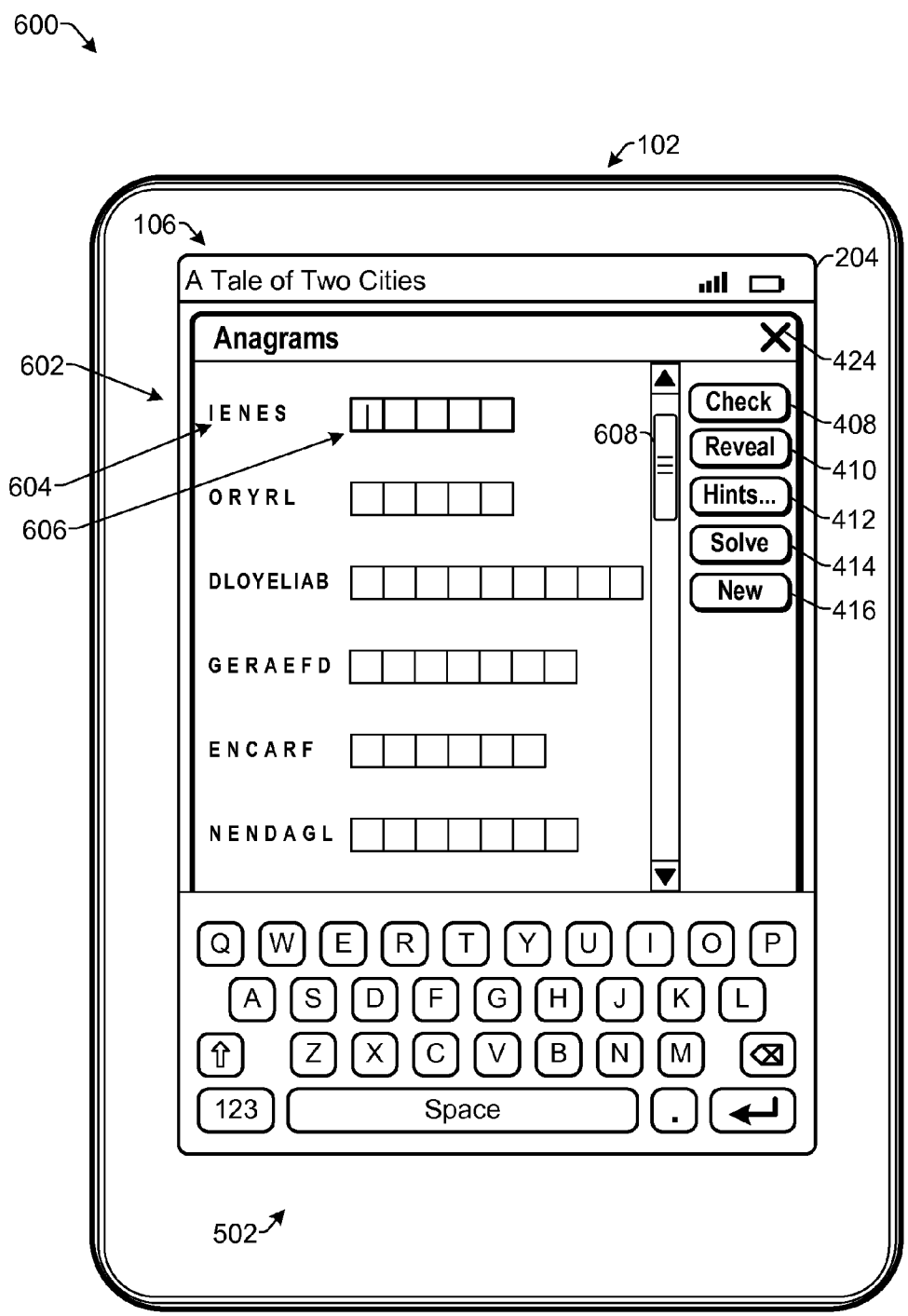
FIG. 6 illustrates an example game interface for an anagram game according to some implementations.

FIG. 6 illustrates an example user interface 600 for an anagram game according to some implementations herein. For example, an anagram game 602 may be generated from the supplemental information for one or more selected digital works in a manner similar to that described above with respect to the crossword puzzle game of FIGS. 4-5B. For example, the anagram game 602 may include a plurality of scrambled words 604 and a plurality of entry spaces 606 to enable a user to enter answers, i.e., unscrambled words from the digital work 106. The user may use the check button 408, the reveal button 410, the hints button 412, the solve button 414, and the new button 416 in manners similar to that described above with respect to the crossword puzzle game 402. For example, a user may select an entry 606 and select the hints button 412 to view a hint interface similar to that described above with respect to FIG. 5B. Furthermore, the anagram game 602 may include a scrollbar slider 608 to enable the user to scroll down to additional scrambled words in the game 602. Furthermore, while several examples of games and game interfaces have been described herein, numerous other games, game formats, game interfaces, and the like will be apparent to those of skill in the art in view of the disclosure herein.

Example Framework for Generating Supplemental Information

Figure 7:
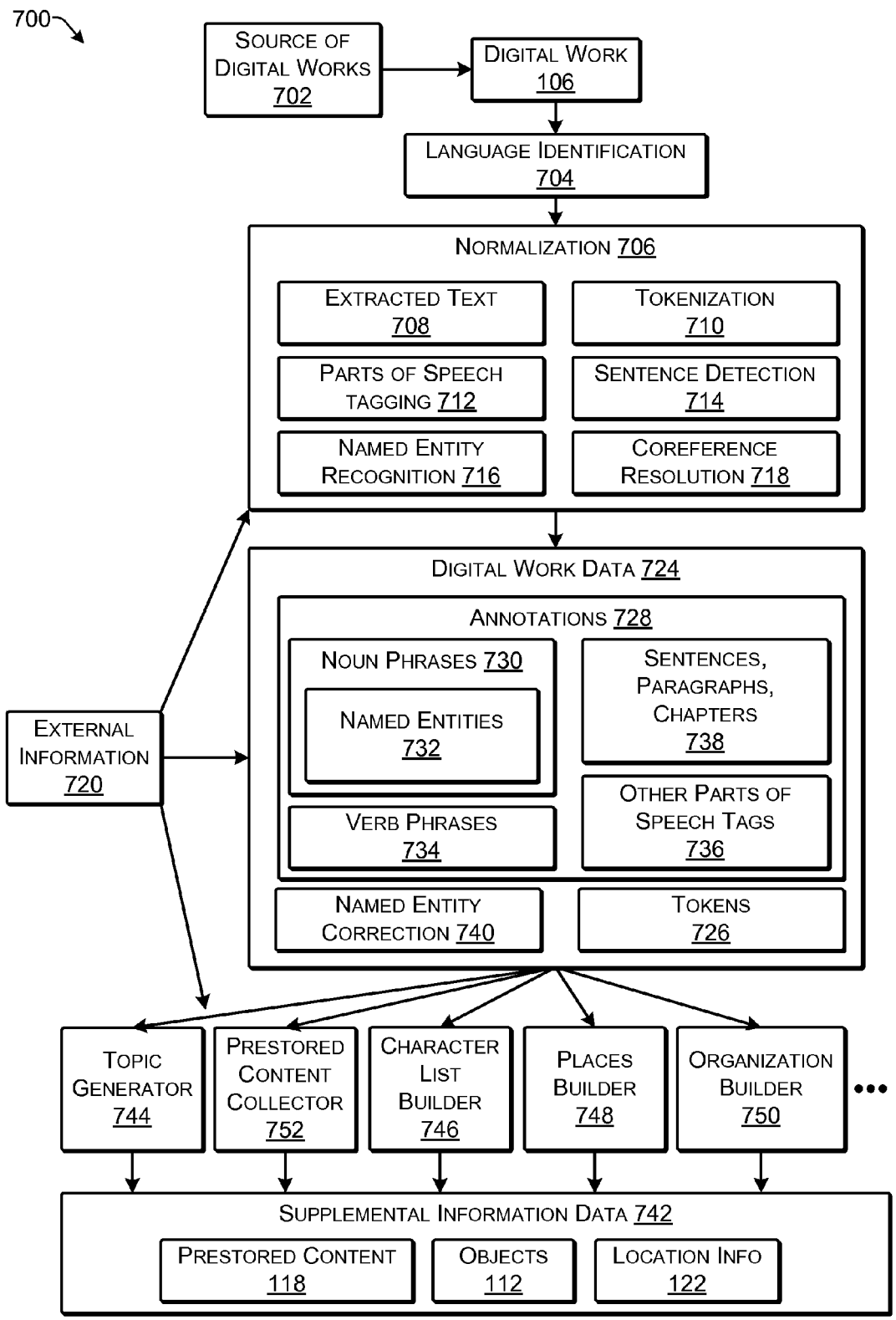
FIG. 7 illustrates an example framework that may be employed for generating supplemental information according to some implementations.

FIG. 7 illustrates an example framework 700 that may be employed by the supplemental information generation module 114 of the digital work provider 104 for generating supplemental information data according to some implementations. In this example, the digital work provider may receive a digital work 106 from a source of digital works 702, such as from a publisher, an author, a digital work library, or other source of digital works. The digital work 106 may optionally undergo language identification, as indicated at 704 to identify the language in which the text associated with the digital work 106 is written. Further, since digital works may be stored in a variety of different formats, the text of the digital work 106 may be normalized, as indicated at 706, by extracting the raw text from the digital work 106 to obtain extracted text 708. The normalization 706 may include tokenization 710 of the extracted text 708 of the digital work 106. As discussed additionally below with respect to FIG. 8, tokenization 710 may include parsing the text of the digital work into tokens that may include individual words, punctuation marks, symbols, etc., contained in the text of the digital work 106, and associating location information with each token identified in the digital work 106. Thus, each word or punctuation mark in the text of the digital work 106 may be assigned a unique location sequence or value, such as based on an offset of the token from the beginning of the digital work and a number of characters in the token, which may be referred to as the length of the token.

Furthermore, normalization 706 may include, or may be followed by, parts of speech tagging 712 and sentence detection 714. Parts of speech tagging 712 may include identification of parts of speech in the text of the digital work 106, such as noun phrases, verb phrases, and various other parts of speech that may be of interest for identifying objects 112 discussed above. Thus, each token may be associated with at least one part of speech. In addition, sentence detection 714 may include identifying sentences, paragraphs, and chapters contained in the digital work 106. In some examples, as discussed additionally below with respect to FIG. 8, the parts of speech, the identified sentences, and so forth, may have location information associated therewith that includes a start identifier, a length, and a type. For instance, a length of a sentence or a part of speech may refer to the number of tokens in the sentence or the part of speech, while the start identifier may be identified using the first token in the sentence or part of speech. Furthermore, in some examples, the parts of speech tagging may be performed incrementally one sentence at a time.

Additionally, normalization 706 may include, or may be followed by, named entity recognition 716 and coreference resolution 718. For example, named entity recognition 716 may include recognizing entities in the digital work, such as names of people, places, organizations, topics, certain numerical expressions, quantities, and so forth. For example, proper nouns, such as names of people, places, organizations, and the like, may be identified based on various lists of names, or other techniques for detecting and distinguishing these separate types of entities. Furthermore, in some cases, external information 720, that is external to the digital work 106, may be employed to assist in named entity recognition, such as by referring to the network accessible resources 116 discussed above with respect to FIG. 1, or other suitable resources such as files or databases of names, nicknames, places, organizations, etc. In addition, coreference resolution 718 may involve identifying occurrences in the digital work 106 in which multiple different expressions or pronouns refer to the same thing in the digital work 106.

The normalization 706, including the operations described above, results in digital work data 724 that may include tokens 726 and annotations 728. The annotations 728 may include noun phrases 730, which may include for example, proper nouns for some named entities 732, such as people/characters, places, organizations, as well as other nouns and noun phrases identified in the digital work 106 for topics and the like. The annotations 728 may further include verb phrases 734 and other parts of speech tags 736 identified in the digital work 106. The annotations 728 may further include information on sentences, paragraphs and chapters 738 identified in the digital work 106.

Additionally, in some instances, named entity correction 740 may be performed for named entities 732 identified in the digital work data 724. As one example, an employee of the digital work provider 104 may check the named entities 732 in the digital work 106 for accuracy. As another example, external information 720 may be applied for checking the named entities 732 in the digital work data 724. For example, the named entities 732 for the digital work 106 may be posted to a network accessible resource, and crowd-sourced information may be relied on for correcting any errors in the named entities 732 for the digital work 106. Thus, the named entities 732 may be posted to a community website, such as Shelfari®, that includes an entry for the digital work 106, and visitors to the community website may provide information to correct any errors in the named entities 732, selected objects 112, or the like. As another example, users who receive the supplemental information with a digital work may note an error in the supplemental information and may provide the external information 720 used for named entity correction 740. Accordingly, crowd-sourced information and crowd-sourced corrections may be used in some cases to perform named entity correction 740.

The digital work data 724 may be used to generate supplemental information data 742, which may include a variety of supplemental information that may be presented to a user to supplement the user's experience when consuming a digital work. For example, a topic generator 744 may employ external information 720 to generate one or more topics from the digital work 106. For example, the topic generator 744 may generate a set of useful topics based on a detection of what the digital work is generally related to and by extension where to find more information about the identified topics such as in the current digital work or other digital works. For example, the topic generator 744 may access Wikipedia® or other network accessible resources 116 to determine which of the noun phrases 730 or other terms identified in the digital work 106 correspond to entries in Wikipedia® or other network accessible resources 116. Some examples assign ranks to candidate topics based in part on an analysis of links to the entry associated with each candidate topic. Any of various link analysis ranking techniques may be applied, such as the PageRank® algorithm, or other suitable link analysis algorithms and processes, for assigning a link-based rank to each topic. Thus, the links to a particular entry corresponding to a particular topic from other entries corresponding to other topics may be considered during ranking of the candidate topics.

Additionally, the contribution of a particular topic to other topics in the digital work may also be considered. This may be determined by calculating a contribution based on an analysis of links from an entry of a candidate topic to the other entries corresponding to the other candidate topics. A link analysis algorithm may also be adapted for making this determination. Thus, the candidate topics may be ranked based on the values of incoming and outgoing links of corresponding entries, and those candidate topics having a rank below a certain ranking threshold may be pruned or otherwise removed from consideration. Further, other techniques may also be used to rank the connectedness of candidate topics. As one example, the ranking of the candidate topics may be based merely on the number of incoming and outgoing links for each candidate topic entry. Other variations will also be apparent to those of skill in the art in view of the disclosure herein.

Furthermore, in some examples, a term frequency-inverse document frequency (tf-idf) value may be calculated for each candidate topic to further refine the number candidate topics for a digital work. For example, a very large corpus of textual works (e.g., thousands or hundreds of thousands of textual works) may be parsed into n-grams, e.g., one-word n-grams, two-word n-grams, three-word n-grams, four-word n-grams, and five-word n-grams. The frequency of occurrence of each n-gram in the corpus may be determined and normalized based on inverse document frequency. The frequency of the candidate phrases in the instant digital work may then be compared with the frequency of those candidate phrases in the works of the overall corpus using tf-idf values. Candidate phrases having a tf-idf value that differs from the tf-idf value for that phrase in the corpus by less than a certain tf-idf threshold may be removed from consideration since they are likely common phrases that do not bear much importance to the subject of the digital work. The candidate topics that remain may be designated as the set of "topics" for the instant digital work.

In addition, a character list builder 746 may build a list of characters from the named entities 732 in the digital work 106 that are identified as corresponding to people or characters. For example, the names corresponding to people in the digital work 106 may be identified, such as through lists of common names, presence of titles and suffixes, lists of nicknames, and so forth. The person names in the list may be further sorted according to the fullness of name, i.e., whether both first name and last name is provided, whether just a first name or just a surname is provided, etc.

The names may subsequently be clustered, and the names in the name sets may further be disambiguated. For example, characters are often referred to by multiple different names in a digital work. As one example, the expressions "the tin man," the "Tin Woodman," "the Woodman," and "Nick Chopper" are all used to refer the Tin Woodman character in L. Frank Baum's series of Oz books. Accordingly, the character list builder 746 attempts to associate these various different expressions with a single character. In some instances, external information 720 may be employed by the character list builder 746, such as by referring to the network accessible resources discussed above, or other suitable resources, such as files or databases of names, nicknames, places, organizations, etc.

Additionally, each person name that is identified may be mapped to a set of annotations or occurrences in the digital work. For example, the name "John" might be mapped to 100 annotations because the named "John" occurs 100 times in the digital work. Furthermore, in some cases, a name may occur in two or more name sets because the digital work may contain two or more characters with the same name or alias. For example, a digital work that discusses both "Bill Clinton" and "Bill Cosby" might have the name "Bill" used by itself in the text of the digital work. In such a case, various techniques may be used to determine which character or person a particular occurrence of the single "Bill" may refer to, such as by determining a distance from an annotation occurrence that includes both "Bill" and a last name.

The character list builder 746 may use the clustered and disambiguated names to create characters for the digital work including the locations of each occurrence of each character name in the digital work. The character list builder 746 may further determine which name to use as the representative or primary name for a particular character, such as based on a fullness or amount of information in the name.

A places builder 748, an organization builder 750, and various other object builders (not shown in FIG. 7) may be included to identify the various objects and the locations of the various placed and organization objects, respectively, in the digital work. For example, the places builder 748 may identify and cluster places that are the same but that are referred to by different names such as by clustering "the English Channel" with "the Channel," in a manner similar to that described above with respect to the character list builder 746. Similarly, the organization builder 750 may use similar techniques to identify organizations such as corporations, groups, teams, institutions, associations, clubs, societies, and so forth, discussed in the digital work. Other object builders may be included for various other objects such as things, themes, scenes, events, interesting or popular phrases, popular highlights, citations, relationships between characters, interactions between characters, time periods, and so forth.

In addition, a prestored content collector 752 may collect and store content related to the objects 112 identified in the digital work 106. For example, the prestored content collector 752 may access the network accessible resources 116 described above to determine whether any descriptive information is available for each of the objects 112 identified in the digital work 106. The prestored content collector 752 may collect the content available for each object and associate the content with the object. Furthermore, in some cases the content may be of a length that is longer than desirable to be presented to a user electronic device. In such a case, the prestored content collector 752 may truncate the descriptive material such as by only including the first paragraph of an article or entry.

Additionally, the prestored content is not limited to text content. In some instances, the prestored content may include an audio clip that demonstrates proper pronunciation of an object, such as a character's name or other phrases or words in a digital work. As another example, when the digital work is an eBook, and there is a movie that corresponds to the eBook, one or more video clips or images from the movie may be provided as the prestored content. As one example, some of the video clips may correspond to particular scenes identified as objects in the supplemental information. As another example, some of the video clips may depict particular characters and these video clips may be included in the prestored content in association with names of the corresponding particular characters. Accordingly, a large variety of prestored content may be included with the supplemental information, with the foregoing being just several illustrative examples.

In addition, for each object 112 identified in the digital work 106, such as by the character list builder 746, the places builder 748, the organization builder 750, the topic generator 744, and so forth, the supplemental information generation module 114 may select an excerpt of text from around the object 112 to enable the object 112 to be displayed in context with the excerpt of surrounding text. For example, the supplemental information generation module 114 may identify a location of each occurrence of each object 112 and may select a portion of text surrounding the occurrence of the object based on various factors, such as sentence breaks and other punctuation, up to a maximum threshold amount of text permitted before and after the object. The supplemental information generation module 114 may determine the start location and end location of the excerpt as well as the location of the object occurrence to be highlighted within the excerpt.

Furthermore, while several examples of supplemental information had been described above, numerous other types of supplemental information may be included in the supplemental information data such as images, maps, videos, audio information and the like. As another example, the user may be presented with an option of accessing dictionary definition information for a selected object.

Figure 8:
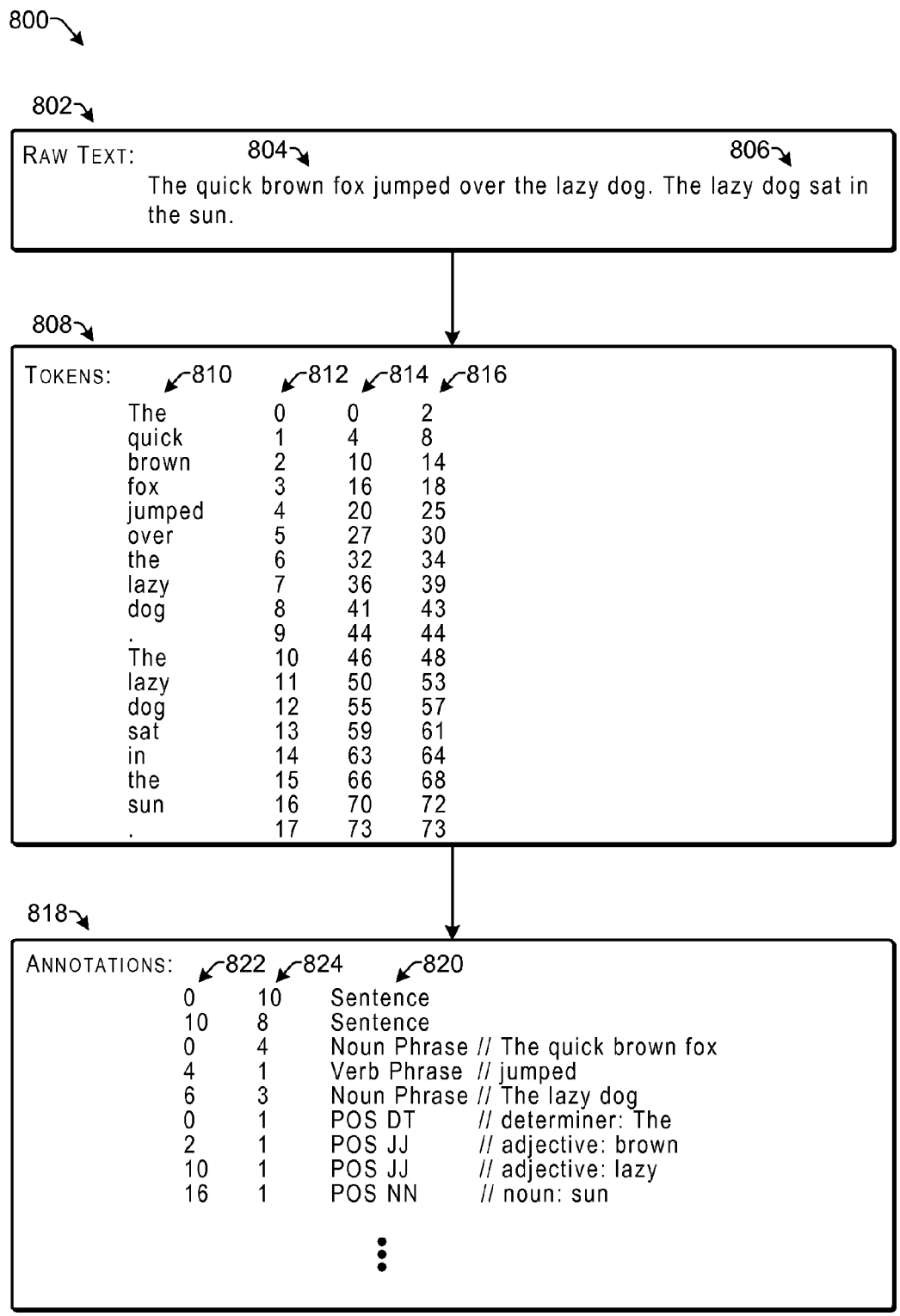
FIG. 8 illustrates an example framework for determining tokens and annotations from raw text according to some implementations.

FIG. 8 illustrates an example framework 800 for determining text tokens and annotations from raw text 802 according to some implementations. In this example, suppose that the digital work has raw text 802 that includes a first sentence 804, "The quick brown fox jumped over the lazy dog," and a second sentence 806, "The lazy dog sat in the sun." The raw text 802 may be parsed or divided into token information 808. For example, each word and punctuation mark in the text 802 may be identified as a separate token 810. Alternatively, in other examples, only words are identified as tokens and punctuation marks are treated as parts of adjacent words or as spaces.

Location information may be assigned to or associated with each token 810 based on the number of characters, such as letters, numbers, spaces, or punctuation marks. The location information may include a sequentially assigned token number 812, a start location or offset 814 and an end location 816. Thus, the word "The" may be the first token in the digital work, and therefore has a token number of "0" as the first token in the digital work. Further, the start location of "The" is also "0," and the end location of "The" is "2" since there are three characters in "The". Next, "quick" is the second token in the digital work and so has a token number of "1." Further, the start location of "quick" is "4" (counting the space between "The" and "quick"), and the end location of "quick" is "8" since there are five characters in "quick." Thus, the entire text of the digital work may be divided into tokens in this manner and each token may be associated with unique location information that identifies the location of the token within the digital work.

Furthermore, annotation information 818 may be determined from the raw text 802 and the token information 808. For annotations, the location is determined based on numbering of tokens, rather than individual characters. For example, annotations 820 may refer to sentences, paragraphs, chapters, or parts of speech, such as noun phrases, verb phrases, as well as other parts of speech such as determiners, adjectives, nouns, adverbs, pronouns, fonts, emphasis on a work, and so forth. Location information associated with each annotation 820 may indicate a start location 822 and a length 824 of each annotation 820 in terms of tokens. For example, the first sentence 804 starts at start location "0" (i.e., the first token), and is "10" tokens in length. Similarly, the second sentence 806 starts at location "10," and is "8" tokens in length. Thus, the annotation information 818 may specify particular locations of annotations within the digital work based at least in part on the locations of the tokens that are included in each annotation.

Figure 9:
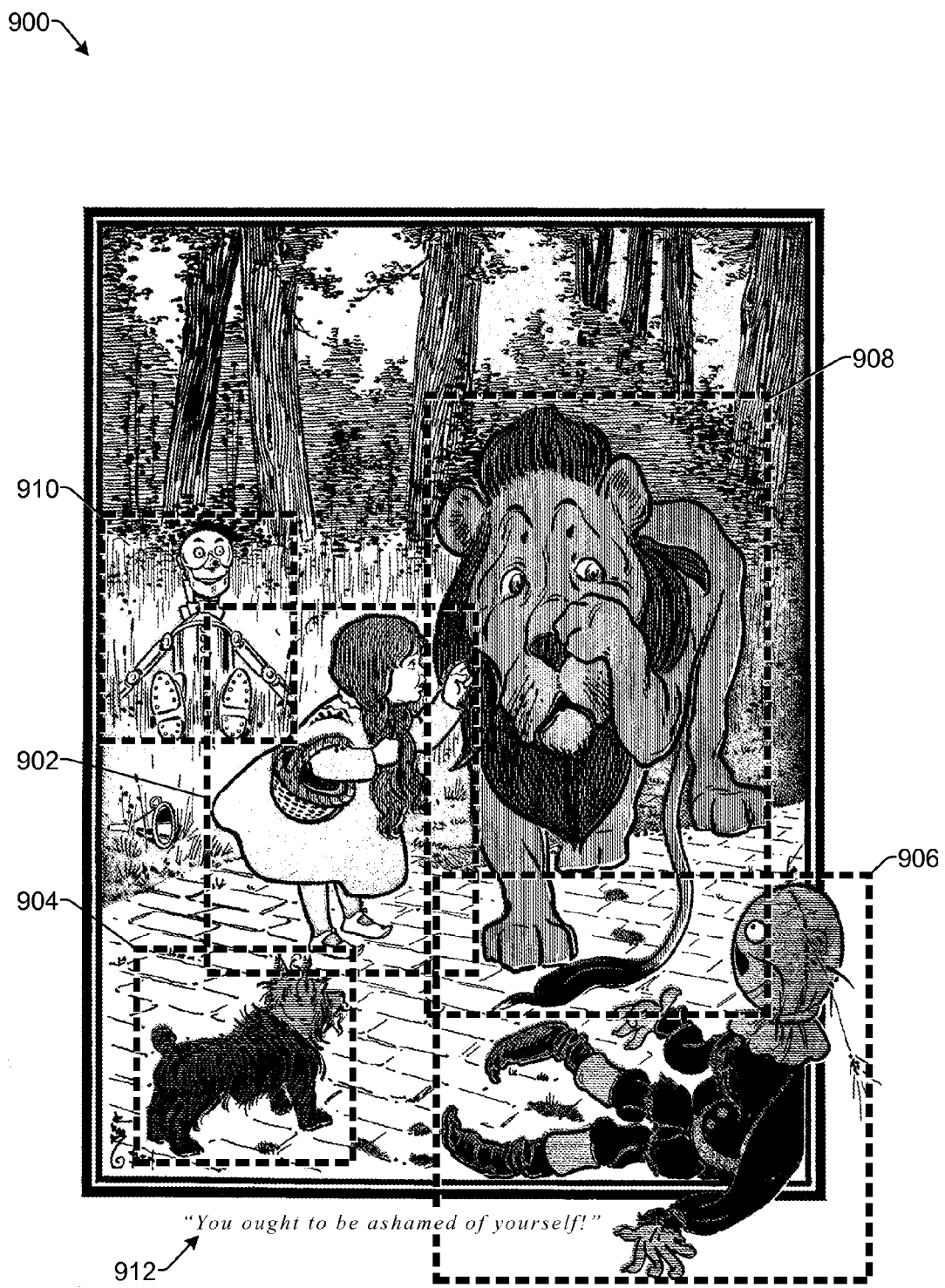
FIG. 9 illustrates an example of determining token locations using coordinates according to some implementations.

Additionally, or alternatively, as illustrated in FIG. 9, the location of a token (and thereby the location of an annotation or object) may be identified or specified using other location identification techniques. For example, the location of each token may be identified according to the coordinates of each token on a page or within an image. For instance, a token may be an image or a portion of an image. Thus, the coordinates of the image or the portion of the image may be identified by a page number on which the image appears and a set of x-y coordinates (i.e., in a plane of the displayed page) or other suitable coordinates. Accordingly, in some cases, an image portion may be used as a clue in a crossword puzzle or otherwise used in a game generated by the game module described herein.

In the example of FIG. 9, suppose that the digital work is Frank L. Baum's *The Wonderful Wizard of Oz*, and an image 900 in the digital work includes multiple characters, such as Dorothy, Toto, the Scarecrow, the Cowardly Lion and the Tin Woodman. A first portion 902 of the image, as indicated by a dashed-lined rectangle, may be identified as including Dorothy, a second portion 904 of the image may be identified as including Toto, a third portion 906 of the image may be identified as including the Scarecrow, fourth portion 908 of the image may be identified as including the Cowardly Lion, and a fifth potion 910 of the image may be identified as including the Tin Woodman. In some examples, the characters may be recognized and identified in the image 900 by an employee of the digital work provider or by a member of a community or crowd-sourced information website, such as Shelfari®. In other examples, the characters may be recognized and identified automatically using one or more image recognition algorithms that identify the characters based on comparison with other available images of the characters, stock image collections of dogs, girls, lions, scarecrows, and so forth.

Each of these image portions 902-910 may be a token and may have location information associated therewith. For example, the location information may identify a page or location number for the overall image and coordinates of the particular image portion on the page or at the location in the digital work. As one example, a rectangle that bounds a token may be used to identify a location of a token based on x-y coordinates of two diagonally opposed corners of the rectangle, such as coordinates of the upper left corner and the lower right corner of the rectangle. Alternatively, the location of the bounding rectangle may be identified by a coordinate of a single corner and a width and a height of the rectangle. Other shapes, such as a circle, oval, triangle, octagon, and so forth, may be used in place of a rectangle for identifying a token location and/or image portion. Additionally, the rectangles corresponding to the image portions 902-910 may not normally be visible, but a user may select a particular image portion to highlight or otherwise select one of the image portions 902-910, such as for selecting a selectable object to view supplemental information associated with the object.

Further, a combination of text offsets and coordinates may be used for identifying token locations. For example, the image 900 of FIG. 9 includes the caption 912: "You ought to be ashamed of yourself!" This text may be tokenized as described above with respect to FIG. 8 based on the words and punctuation marks contained therein. Thus, in some examples, the location of the words and punctuation marks in the caption 912 may be tokenized using a text-based offset, by simply continuing from the text of the immediately previous page. In other examples, the location of the text and punctuation marks in the caption 912 may identified using coordinates of the words and punctuation marks. For example, a location of a bounding box for each word or punctuation mark may be identified. Additionally, in some examples, the entire text of a digital work may be tokenized using coordinate locations rather than text offset. Furthermore, various other techniques for generating tokens and identifying the locations of tokens will also be apparent to those of skill in the art in light of the disclosure herein, with the foregoing being merely several non-limiting examples.

As mentioned above, an image, such as the image 900, or one or more portions thereof, may be used in a game. For example, portions of the image 900 may be used as clues or hints in a crossword puzzle game or other games. As another example, a picture-find game may be generated from an image, such as image 900, with the user invited to select or otherwise identify the characters or other objects displayed in the image. For instance, the game may sequentially display a character's name, and the user may tap on the character's image portion to select the character as each character name is displayed sequentially. Numerous other games will be apparent to those of skill in the art having the benefit of the disclosure herein.

Example Structure

Figure 10:
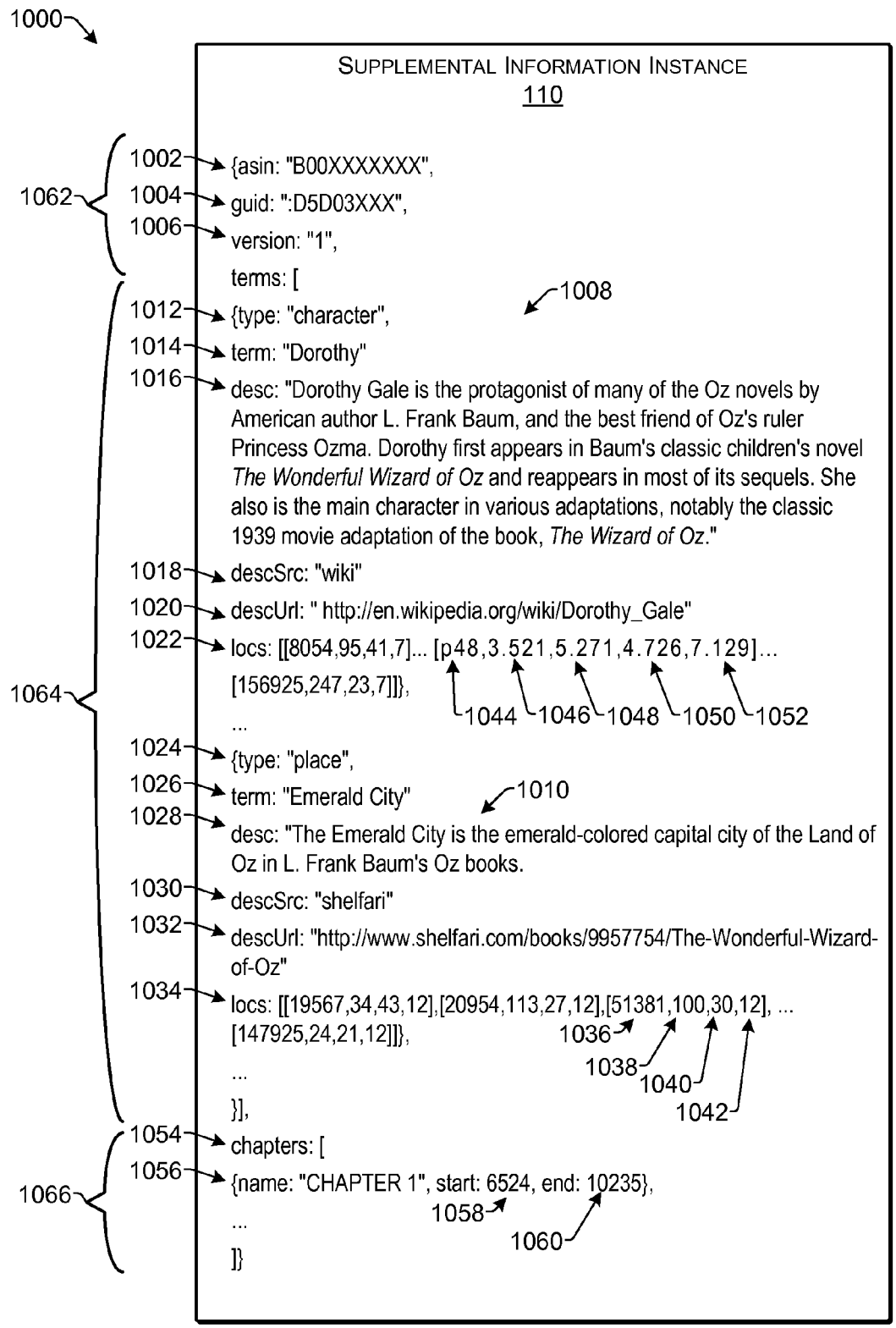
FIG. 10 illustrates an example structure of a supplemental information instance for a digital work according to some implementations.

FIG. 10 illustrates an example structure 1000 of a supplemental information instance 110, such as for a digital work 106 discussed above according to some implementations. In this example, the structure 1000 is formatted according to the JSON (JavaScript Object Notation) standard; however, implementations herein are not limited to any particular standard, programming language, protocol, or the like.

The structure 1000 includes an identifier 1002 that identifies the digital work 106 to which the supplemental information instance 110 corresponds. For example, the identifier 1002 may be any suitable identifier, such as an ASIN (Amazon Standard Identification Number), a 9-digit or 13-digit ISBN (International Standard Book Number), an ISSN (International Standard Serial Number), an LCCN (Library of Congress Control Number), or any other suitable identifier that can be used to correlate the supplemental information with the correct corresponding digital work. For example, in some cases, the identifier 1002 may merely be the title of the digital work, an arbitrarily assigned number, or the like. The structure 1000 may further include other header information such as a GUID 1004, which may be a globally unique identifier for the file content of the digital work; and a version 1006, which may indicate a format version of the structure 1000.

The structure 1000 may further include object information for one or more terms or objects in the digital work 106. In the illustrated example, first object information 1008 is included for the character object "Dorothy," and second object information 1010 is included for the place object "Emerald City," although object information for numerous other objects, including topics, things and organizations, may be similarly included in the structure 1000. The object information 1008 includes an object type 1012, which in this example is a "character," an object term 1014, "Dorothy," which is the representative name for the object, and an object description 1016. The object description 1016 may be an excerpt or description obtained from one or more network accessible resources 116, as described above. In this example, the description is an excerpt obtained from a Wikipedia® article on the character Dorothy from *The Wonderful Wizard of Oz*. Accordingly, a description source 1018 may indicate that the source of the description is Wikipedia®, and a description URL 1020 may indicate the URL from which the prestored content description 1016 was drawn. For instance, a user having network connectivity may access the description URL 1020 for performing further reading on the particular object.

Additionally, in some examples, the description URL 1020 may be provided instead of the prestored content in the description 1016. Thus, in some examples, during game generation, the game module may follow the URL 1020 to obtain content to use as a clue for a crossword puzzle entry for which "Dorothy" is the answer. In other examples, however, where prestored content 1016 is provided, the game module may draw the clues from the prestored content 1016. Further, location information for one or more locations 1022 of occurrences of the object are included to identify the locations of one or more respective occurrences of the object in the digital work. Accordingly, in some examples, the game module may draw the clues form the text of the digital work at the location of one or more occurrences of the object identified at 1022.

Similarly, the object information 1010 for "Emerald City" includes an object type 1024, which in this example is a "place," an object term 1026, "Emerald City," which is the primary name for the object, and an object description 1028. In this example, the description is an excerpt that may have been obtained from a Shelfari® listing on the Emerald City under the entry for *The Wonderful Wizard of Oz*. Thus, a description source 1030 may indicate that the source of the description is Shelfari®, and a description URL 1020 may indicate the URL from which the descriptive content was drawn. One or more locations 1034 are included to identify the location of one or more respective occurrences of the object in the digital work. Further, while two types of objects have been illustrated in this example for discussion purposes, numerous other objects and other types of objects, as enumerated above, may be included in the structure 1000 and similarly formatted.

The locations 1022, 1034 provided for the objects may include four or more values that represent an excerpt of text from the digital work and one or more object occurrences to highlight in the excerpt. For example, suppose an excerpt of text goes from location 51381 to location 51481 and contains a highlighted object occurrence at 51411 to 51423. This may be expressed using four discrete numbers or values to represent both the excerpt and the highlighted term within the excerpt. The first value 1036 in the location information represents the starting location of the excerpt in the digital work as an offset from the beginning of the digital work, as discussed above with respect to the tokens of FIG. 8. Thus, in this example, the starting location is "51381" as indicated at 1036. In addition, the length of the excerpt is "100" positions (e.g., each position may correspond to one character, space or punctuation mark), with the object to be highlighted starting 30 positions into the excerpt. Accordingly, the second value 1038 in the location information, which is "100" in this example, indicates the length of the excerpt (or the number of positions in the excerpt). The third value 1040 indicates the starting location (30) of the object occurrence in the excerpt, and the fourth value 1042 indicates the length (12 positions or characters) of the object in the excerpt. Thus, the location numbering enables extraction of an excerpt of text from the digital work and highlighting of the object in context in the excerpt. Further, when more than two objects are contained in a single excerpt, then six numbers may be used to represent the locations of the two objects within the single excerpt, with the last two values representing the start location and length of the second object to be highlighted in the excerpt.

In addition, it may be noted that the locations associated with each object in the structure 1000 provide an index for locating other occurrences of a selected object. Thus, by grouping the locations of the occurrences of an object with one another in the manner described in FIG. 10, name merging of alternate names may be automatically provided for so that listing of separate alternate names in the structure 1000 is not necessary. For example, suppose that a digital work contains separate occurrences of the names "Dorothy," "Dorothy Gale," and "Miss Gale." These alternate names may be clustered and disambiguated by the character list builder, as described above, to all relate to the single character "Dorothy Gale." Accordingly, the locations of the different occurrences of "Dorothy," "Dorothy Gale" and "Miss Gale" may be included in the locations 1022 for "Dorothy." Consequently, if a user selects an occurrence of the object "Dorothy" in the text of the digital work, the location of the selected object is used to identify the object information 1008 for the selected object, and thereby to identify all other occurrences of the object, regardless of whether the occurrences are "Dorothy," "Miss Gale," or "Dorothy Gale." Consequently, merging of alternate names is automatically achieved through the use of locations to identify selected objects, thereby negating the need to have separate object information listings for "Dorothy," "Miss Gale," and "Dorothy Gale.

In addition, in some examples, the location information 1022, 1034 may include location information related to other digital works as well. For example, suppose that the supplemental information instance 110 corresponds to *The Wonderful Wizard of Oz*. Furthermore, suppose that the Dorothy Gale character appears in a number of other Oz books. Location information may be included for those other Oz books as well, as discussed additionally below, to enable displaying of supplemental information for an object across a series or other plurality of digital works. As one example, the location information for locations outside a particular digital work may include a fifth value that may be the digital work identifier 1002 described above for the other digital work.

In addition, as discussed above with respect to FIG. 9, in some cases, the location information for some or all of the objects may be based on a coordinate system, rather than, or in addition to, a text offset. In the illustrated example of FIG. 10, the location information 1022 for Dorothy includes both text offset location information (i.e., "[8054,95,41,7]," and "[156925,247,23,7]"), as well as coordinate system location information ("[p48,3.521,5.271.4.726,7.129]"). The coordinate system location information in this example includes a page number 1044, a first x-axis coordinate 1046, a first y-axis coordinate 1048, a second x-axis coordinate 1050, and a second y-axis coordinate 1052. Thus, the first x and y coordinates 1046, 1048 may identify a location of a first corner of a bounding box and the second x and y coordinates 1050, 1052 may represent a location of a second corner of a bounding box that encompasses a particular token. For example, the coordinate system location information in this example may describe the position of a rectangle that includes an image of Dorothy, as discussed above with respect to FIG. 9. As an alternative, the second two values 1050, 1052 may be a width and height of a bounding box having a corner located at the first two coordinates 1046, 1048. Still alternatively, in the case that a bounding circle is used, rather than a bounding box, the first two coordinates may be a location of a center of the circle and only one additional value may be used to specify a radius of the bounding circle. Numerous other variations will be apparent to those of skill in the art having the benefit of the disclosure herein.

In the structure 1000 of FIG. 10, following the conclusion of the term or object information, the structure 1000 may include chapter information for chapters 1054 of the digital work. Thus, each chapter 1054 may be identified by the name 1056 of the chapter, i.e., "CHAPTER 1" in this example, the start location 1058 of the chapter and the end location 1060 of the chapter. Accordingly, in the illustrated example, the structure 1000 includes three sections, namely a header section 1062, a terms or object information section 1064, and a chapters section 1066. Further, other types of supplemental information may be included in the structure 1000 in addition to examples described above. Accordingly, implementations herein are not limited to the particular example structure illustrated, and numerous other structures and formats will be apparent to those of skill in the art having the benefit of the disclosure herein. Additional examples of structures, techniques and user interfaces for providing supplemental information are described in U.S. patent application Ser. No. 13/246,759, filed Sep. 27, 2011, the entire disclosure of which is incorporated herein by reference.

Furthermore, as mentioned above, the structure 1000 may be accessed by the game module 126 for generating a game 128. For example, if a game is to be generated in connection with *The Wonderful Wizard of Oz*, any of the objects (e.g., 1008, 1010, etc.) included in the supplemental information instance 110 of FIG. 10 may be selected for use in the game. For instance, suppose that the game to be generated is a crossword puzzle. The game module 106 may select the objects "Dorothy" and the "Emerald City" as two of the answers to be used for crossword puzzle entries, as well as a number of other objects from the supplemental information instance 110 that are not shown in FIG. 10. Furthermore, the game module 126 may also select the clues for the crossword puzzle based on information contained in the supplemental information instance 110. For example, the clue for "Dorothy" may be extracted from the description 1016, which is an excerpt of a Wikipedia® entry on Dorothy that is stored with the supplemental information instance 110. For example, the game module may use various heuristics to truncate the description 1016 when selecting a clue, such as selecting a single sentence from the description 1016, and may further check to ensure that the selected sentence does not include the name "Dorothy" or any obvious variations of the name "Dorothy" therein.

Alternatively, the game module may select a clue by accessing information on Dorothy from the locations in the digital work listed at 1022. For example, the game module may cross-reference the locations listed at 1022 with popular highlights, or other community or aggregated information on the digital work to determine which locations are likely to contain clues that would be recognized by a majority of users. For instance, the locations of occurrences of Dorothy that coincide with popular highlights may include well-known or popular quotations made by Dorothy that can be used as a clue. Furthermore, as mentioned above, to increase the difficulty of a clue, a less popular location may be selected as the clue.

As still another alternative, the game module may access the URL 1020, which is the Wikipedia® entry for "Dorothy." Accordingly, rather than being limited to the description 1016 stored with the supplemental information instance, the game module may access the full article on Dorothy at the Wikipedia® website, or a mirror thereof. Furthermore, of course, information from other network accessible resources such as Shelfari®, IMDb®, or the like may be accessed in place of Wikipedia®. Additionally, in some cases, the supplemental information instance 110 may include additional information not shown in FIG. 10 such as relationships between characters, which may also be used in the generation of clues for a particular object. Accordingly, the foregoing sets forth several examples for determining clues, but implementations herein are not limited to the examples given, and may be extended utilizing other types of information, as would be apparent to those of skill in the art having the benefit of the disclosure herein.

Example System Architecture

Figure 11:
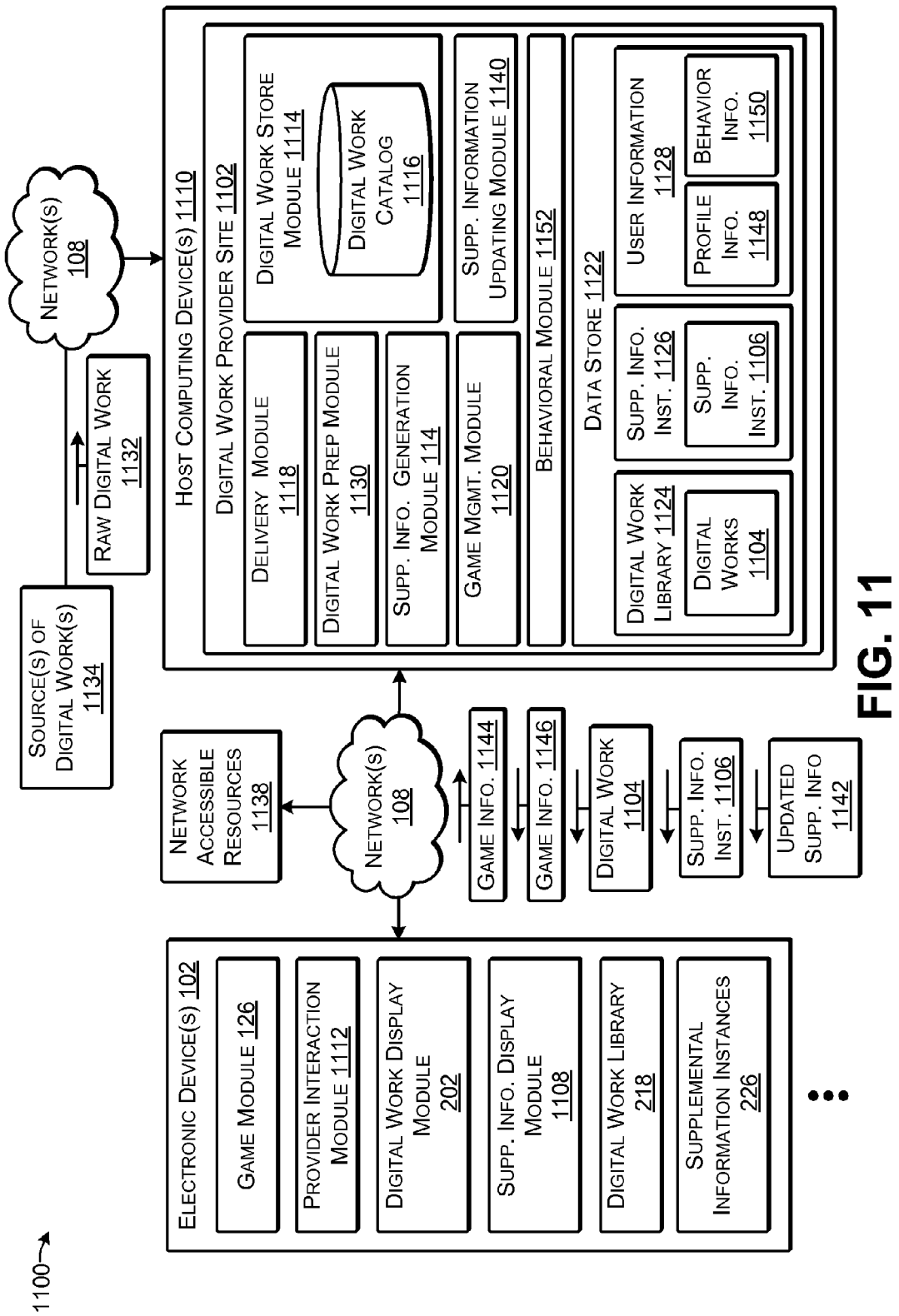
FIG. 11 illustrates an example architecture of a system for providing supplemental information for a digital work according to some implementations.

FIG. 11 illustrates an example architecture of a system 1100 including a digital work provider site 1102 for providing one or more digital works 1104 and corresponding supplemental information instances 1106 to one or more electronic devices 102 according to some implementations. In some cases, the digital works 1104 correspond to the digital works 106, and the other digital works described above, and the supplemental information instances 1106 correspond to the supplemental information instances 110, and the other supplemental information instances described above. As one example, the digital work provider site 1102 may be a merchant website, an e-commerce site, or the like, that offers digital works 1104 to the public. In some implementations, the digital work provider site 1102 may offer digital works 1104, such as books, magazines, newspapers, songs, movies, and so forth, to the public through a website, other type of electronic commerce site, an online location, or the like.

In some examples, the digital work provider site 1102 may alternatively, or additionally, provide digital works through an online or mobile application executing on the electronic device 102. For example, an application on the electronic device 102 may connect to or obtain content from the digital work provider site 1102 to enable the purchase or management of digital works, and the like. Thus, the digital work provider site 1102 may enable an electronic device 102 to access digital works 1104 through an online or mobile application executing on a mobile device, such as an eBook reader, smart phone, tablet computing device, or the like. Accordingly, the digital work provider site 1102 is not limited to a website accessed by a browser, but may encompass other technologies for obtaining digital works, such as through in-application shopping, and the like.

The digital work provider site 1102 is able to communicate with one or more electronic devices 102 through one or more networks 108. For example, the network(s) 108 may include a local area network (LAN), a wide area network (WAN), such as the Internet, or any combination thereof, and may include both wired and wireless communication technologies using any suitable protocols and communication techniques. The digital work provider site 1102 and the electronic device 102 may communicate and interact with one another using any combination of suitable communication and networking protocols, such as Internet protocol (IP), transmission control protocol (TCP), hypertext transfer protocol (HTTP), and so forth.

In some implementations, the digital work provider site 1102 may be hosted on one or more host computing devices 1110. As one example, the host computing device(s) 1110 may be one or more web servers located at a data center, server farm, or other single physical location. In other examples, the digital work provider site 1102 or portions thereof may be located in diverse locations that are physically remote from one another. Further, in some implementations, the digital work provider site 1102 may be a group of websites, data stores, services, and the like, hosted on a plurality of different host computing devices 1110 in a plurality of diverse locations, or hosted by one or more host computing devices 1110 at a single location.

In the illustrated example, the electronic device 102 may include the digital work display module 202, the game module 126, the digital work library 218, the supplemental information instances 226, as discussed above with reference to FIG. 2. The electronic device 102 may further include a supplemental information display module 1108 that may display supplemental information from a supplemental information instance 226 in response to a user input. For example, in response to a user selection of an object 112 in a displayed digital work, the supplemental information display module may obtain supplemental information related to the object for display to the user.

As one example, suppose that the user is reading an electronic book (eBook) and encounters a topic for which the user would like to obtain more information. The user may select the topic from the displayed text of the eBook. In response to the selection, the device may access the supplemental information for that topic to present a user interface that displays a visual representation of other locations or occurrences within the eBook where the topic also appears. Thus, the user may employ the user interface to refer to another location in the eBook to access other locations where the selected topic is discussed. For example, the user interface may be further navigated to present excerpts from the digital work of one or more other occurrences at which the topic appears, along with surrounding text. Additionally, or alternatively, prestored content such as an excerpt of an article, essay, commentary, discussion or other composition drawn from an authoritative source, such as Wikipedia®, may be included with the supplemental information to provide a description, explanation or definition of the selected object.

The electronic device 102 may further include a provider interaction module 1112, which in some instances may be an application, such as a web browser, mobile application, or other module or computer program configured to receive web content, webviews, online content, or the like, for accessing and interacting with the digital work provider site 1102. For example, the provider interaction module 1112 may enable the user 124 to shop for digital works at the digital work provider site 1102 and access or receive digital works 1104 from the digital work provider site 1102, such as by downloading through the network(s) 108. Further, in some implementations, the provider interaction module 1112 may enable the user 124 to organize or manage the digital works on the electronic device 102, while in other implementations, a separate management module (not shown) may provide this functionality.

The digital work provider site 1102 may include a digital work store module 1114 that may provide or may access a digital work catalog 1116. For example, the digital work store module 1114 may present the digital work catalog 1116 to an electronic device 102 that accesses the digital work provider site 1102 to shop for a digital work 1104. The digital work catalog 1116 may include searchable and/or browsable listings and descriptions of digital works 1104 available from the digital work provider site 1102. The digital work store module 1114 may communicate with the provider interaction module 1112 on the electronic device 102 to enable the user 124 to locate and acquire a digital work from the digital work provider site 1102.

The digital work provider site 1102 may further include a delivery module 1118 that may deliver a digital work to the electronic device 102 and/or the user 124. For example, in some instances, the delivery module 1118 may facilitate the download of a digital work to the electronic device 102 over the network(s) 108. In other instances, the delivery module 1118 may provide for delivery of a hard copy of the digital work to the user, such as by delivery of a recording medium that maintains a copy of the digital work, depending on the nature of the digital work and the electronic device 102.

Furthermore, in some implementations, the delivery module 1118 may refer to the user information 1128 to determine one or more digital works 1104 to download to the electronic device 102. For example, a user 124 may have purchased or otherwise accessed digital works 1104 from the digital work provider site 1102 in the past. The user 124 may acquire a new electronic device 102 and desire to have the previously purchased digital works 1104 accessible on the new electronic device 102. Consequently, the delivery module 1118 may deliver, or make available for delivery, the previously purchased digital works 1104 to the new electronic device 102 and, contemporaneously, may also deliver the supplemental information instance 1106 corresponding to each of the digital works 1104 delivered to the new electronic device 102, such as before, during or after delivery of the digital works 1104. For example, the user information 1128 may include account information, a purchase history, a user library, or other records of digital works of the user 124, such as with respect to a first electronic device 102. Subsequently, when the user 124 acquires a second electronic device 102, the delivery module 1118 may refer to the user information 1128 to determine, at least in part, digital works and related supplemental information to download to the second electronic device 102. Accordingly in some instances, the delivery module 1118 may assist in synchronizing the content of multiple devices of a user or a single account.

The digital work provider site 1102 may further include a game management module 1120. In some examples, the game management module 1120 may provide the game module 126 to the delivery module 1118 to make the game module 126 available to the electronic devices 102. Furthermore, the game management module 1120 may provide updates to the game modules 126 on the electronic devices 102. In addition, the game management module may synchronize games and game information among multiple devices 102 and/or collect and aggregate game information from multiple electronic devices 102, as discussed additionally below.

The digital work provider site 1102 may also include various other site components as is known, depending on the design and intended use of the digital work provider site 1102. For example, the other site components may include one or more pages of content, such as webpages, webviews, or other online content, that may be presented to the user 124 through the provider interaction module 1112, such as during shopping for digital works from the digital work provider site 1102.

The digital work provider site 1102 may include or may access one or more data stores 1122 that include a digital work library 1124, supplemental information instances 1126, and user information 1128. For example, the digital work library 1124 may include a plurality of digital works 1104 that the digital work provider has available for access by the user 124, such as by purchase through the digital works catalog 1116. The supplemental information instances 1126 may include a supplemental information instance 1106 for at least some of the digital works 1104 in the digital work library 1124. For example, the digital work provider site may generate the supplemental information instance 1106 for the digital works 1104 in the digital work library 1124. Further, the user information 1128 may include information for a plurality of users 124 of the digital work provider site 1102. For example, the user information 1128 may include account information for each user for identifying and interacting with the user, such as name, email address, mailing address, telephone number, user identification (ID) number, user purchase history (e.g., digital works acquired by the user) so forth.

The digital work provider site 1102 may also include a digital work preparation module 1130 that may receive raw digital works 1132 from one or more sources of digital works 1134. For example, the sources of digital works 1134 may be publishers, authors, movie distributors, studios, music companies, artists, and so forth. In the case of textual digital works, the digital work preparation module 1130 may receive a raw digital work 1132 from the publisher, author, or other source of digital works 1134, and may parse and process the raw digital work 1132 to make the digital work compatible with various display formats, device platforms, and so forth. For example, the digital work preparation module 1130 may identify the start location and end location of pages, paragraphs, sentences, and other information in the digital work, and may produce metadata for the digital work that identifies the digital work and the properties of the digital work to enable rendering of the digital work on an electronic device 102.

The digital work provider site 1102 may further include the supplemental information generation module 114, which may operate on the digital works 1104 in the digital works library 1124 to produce the supplemental information instance 1106. For example, the supplemental information generation module 114 may select a particular digital work 1104 from the digital work library 1124 for generating a corresponding supplemental information instance 1106 for the particular digital work 1104, such as based on the framework 700 described above with reference to FIG. 7. The supplemental information generation module 114 may parse and index the digital work by identifying characters, people, things, phrases, places and so forth that are of significance in the digital work. In some examples, the supplemental information generation module 114 may access various authoritative sources of information, as well as performing statistical analysis and modeling to identify the significant objects in the particular digital work 1104. Thus, during the parsing, the supplemental information generation module 114 may identify candidate objects that are candidates to make into objects for the digital work, such as by identifying proper names, place names, statistically improbable phrases, and the like, in the text of the digital work. For instance, a statistically improbable phrase is a word or combination of words that occur in the text of a digital work one or more times in a manner that is out of a predetermined threshold. For example, if a particular phrase is used multiple times in a digital work, while not being used or being used rarely in other digital works, this may be a statistically improbable phrase that is a candidate to become an object of the digital work.

To determine which candidate objects to make into objects, the supplemental information generation module 114 may access other sources of information outside the digital work. For example, the supplemental information generation module 114 may access network accessible resources 1138 that may include online sources of information, such as Wikipedia®, Shelfari® and IMDb®, online dictionaries, or other online resources, to determine identification of characters and other significant phrases, things, events or places in a digital work 1104. Further, the supplemental information generation module 114 may obtain additional information on the statistically improbable phrases in the particular digital work 1104, such as by obtaining definitions or other information for these phrases from various locations, such as the authoritative sources mentioned above.

Following identification of the objects in the digital work, the supplemental information generation module 114 may identify or obtain, where available, excerpts with respect to identified objects in the particular digital work from the authoritative sources. For example, the supplemental information generation module 114 may obtain content on an object, such as an excerpt from a Wikipedia® article, a Shelfari® or IMDb® page, or the like, to include with the supplemental information instance 1106 as prestored content for the objects identified in the particular digital work 1104. In other examples, the supplemental information generation module 114 identifies the location of the content containing information about the object and includes a reference identifier to a network location of the content, rather than the content itself, with the with supplemental information.

The supplemental information instance 1106 generated for each digital work may be stored in the supplemental information instances 1126. When the user 124 acquires a particular digital work 1104, such as through interaction with the digital work store module 1114, the delivery module 1118 may deliver, or make available for delivery, the particular digital work 1104 to the electronic device 102, and may also deliver, or make available for delivery, the corresponding supplemental information instance 1106 for the particular digital work. For example, the particular digital work 1104 and the corresponding supplemental information instance 1106 may be downloaded contemporaneously from the digital work provider site 1102, e.g., as a package or as a sequential download.

Further, as mentioned above with respect to FIG. 2, updated supplemental information may also be provided for delivery to the electronic device 102 for the digital works stored on the electronic device 102, such as during one-time updates or at regular interval updates. The digital work provider site 1102 may include a supplemental information updating module 1140 that checks for updates to the supplemental information instance 1106. For example, the supplemental information updating module 1140 may check for updates to the digital work library 1124 that may necessitate updating a supplemental information index, such as to expand a library view of particular objects to include newly added digital works. Further, the supplemental information updating module 1140 may check for changes to prestored content in the supplemental information instance 1106 and/or may determine that links or network locations for new sources of information about objects in the supplemental information are available. For example, the supplemental information updating module 1140 may update the supplemental information instance 1106 for a digital work to include updated prestored content, new prestored content, or new or different reference identifiers to online sources of information about an object. Further, as mentioned above with reference to FIG. 2, the supplemental information updating module 1140 may apply one or more policies, thresholds, or the like, to determine whether the changes to the prestored content, reference identifiers, or other supplemental information are significant enough to warrant the distribution of updated content.

When supplemental information instance 1106 for a particular digital work 1104 is updated an amount significant enough to merit distribution of updated supplemental information, the supplemental information updating module 1140 may use user information 1128 to determine one or more electronic devices 102 that have an older version of the supplemental information. The supplemental information updating module 1140 may make updated supplemental information 1142 available for delivery to the one or more electronic devices 102 to update the supplemental information on those electronic devices 102. The delivery module 1118 may deliver the updated supplemental information 1142, or may provide the updated supplemental information 1142 to an intermediary that performs the delivery.

Furthermore, in some examples, the game module 126 may provide game information 1144 to the host computing devices 1110 of the digital work provider site 1102. For example, the game information 1144 may include information about any games generated and/or played using the game module 126 on the electronic devices 102. Further, the game information 1144 may identify the content of each game played, the clues provided for each game, whether the user was successful in determining an answer based on a particular clue, a stopping point or saved location for a particular game, an amount of time spent on the game, and various other game information. In some cases, the game information 1144 may be used to synchronize a saved game on a first electronic device 102 with games on other electronic devices 102 of a particular user or particular account. Accordingly, a user may stop playing a particular game on the first electronic device 102 of the user and may resume playing the same game at a saved location on a second, different electronic device 102 of the user based on the synchronizing of the game information 1144 by the digital work provider site 1102. For example, the game management module 1120 on the digital work provider site 1102 may receive the game information 1144 and may identify other devices 102 of the user with which to synchronize the game information 1144 for a particular user or account, and may send game information 1146 (which may include game synchronization information) to the other devices 102.

Furthermore, in some examples, the game management module 1120 may aggregate game information 1144 received from a plurality of electronic devices 102 and from a plurality of different users. For example, the game management module 1120 may store the game information 1144 for each user in the user information 1128. The user information 1128 may include profile information 1148 that may include user account information, as well as explicit choices, preferences, and the like, expressed by a particular user. For example, the profile information 1148 may indicate digital works for which a game was played, choices made by the user, such as level of difficulty, spoiler settings, whether only a portion of a work was selected, and so forth. Additional user information, user behavior information 1150, may include more implicit information, such as which clues enabled a user to solve a puzzle for which answers, an amount of time required to complete a puzzle when particular clues and answers were used, and so forth. The game management module 1120 may then determine from the aggregated game information various types of statistics, such as user success rates with respect to particular answers, clues, hints, types of answers, types of clues, and various other parameters. For example, the game management module 1120 may enlist a behavioral module 1152 that may use statistical modeling and other analysis techniques to determine aggregated user success rates, types of clues and answers to use for achieving a desired difficulty level, and so forth. The game management module 1120 may then employ this information for improving the game module 126 and the game experience for the users. For example, the aggregated game information 1144 may indicate that clues from a particular location or source may have been useful in solving a puzzle answer 25% of time, while clues from another location may have been useful in solving for the same answer 75% of the time. Accordingly, the game management module 1120 may update the game module 126 by sending game information 1146 to the electronic device(s) 102 to enable the game module 126 to manage the difficulty level of future games based on the aggregated information. Thus, the aggregated information may be used to increase the quality of the games and game play. Numerous other variations will be apparent to those of skill in the art in light of the disclosure herein.

Example Electronic Device

Figure 12:
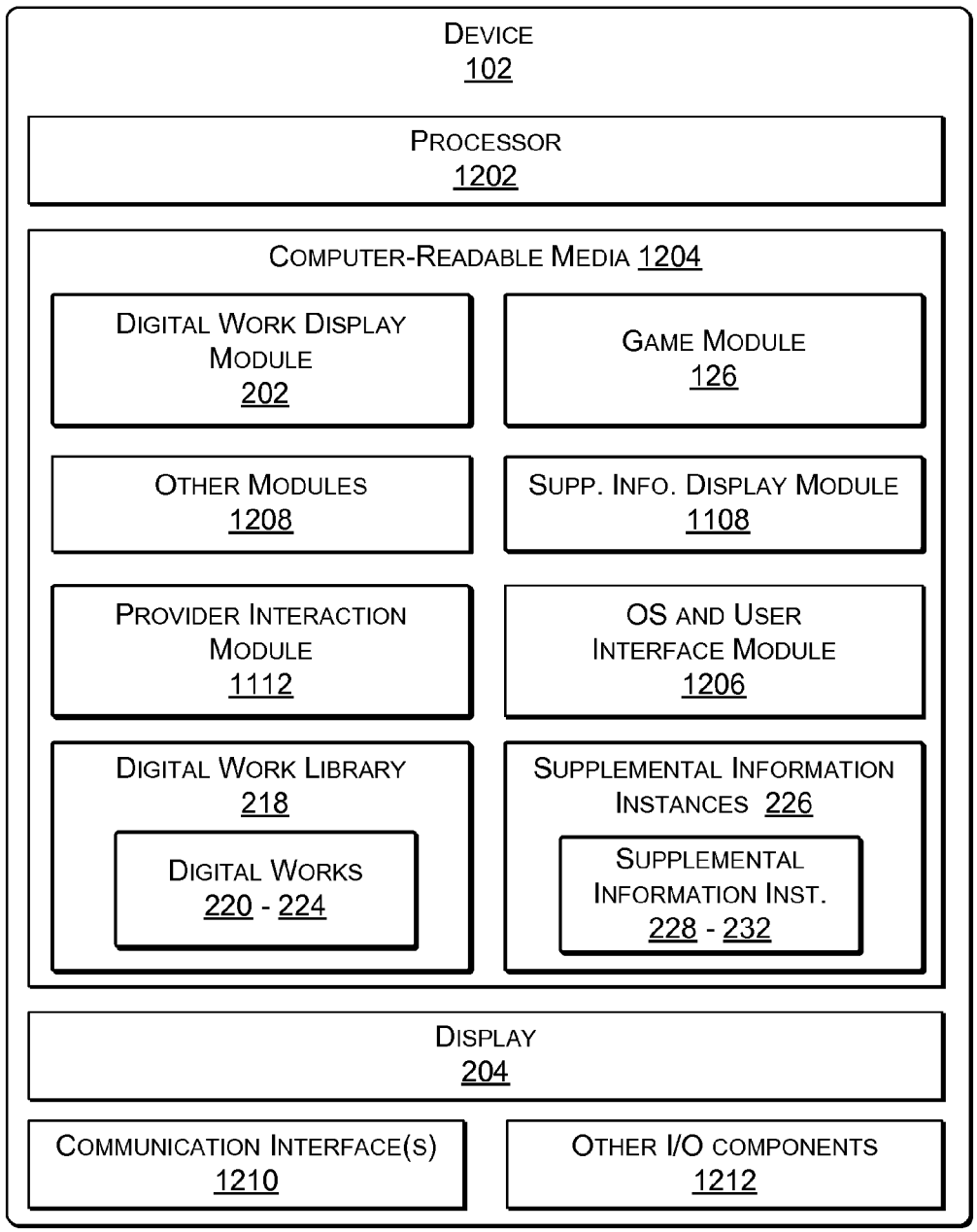
FIG. 12 illustrates select components of an example electronic device according to some implementations.

FIG. 12 illustrates select example components of the electronic device 102 that may be used to implement the functionality described above according to some implementations. In a very basic configuration, the electronic device 102 includes, or accesses, components such as at least one processor 1202 and a computer-readable media 1204. Each processor 1202 may itself comprise one or more processors or cores. Depending on the configuration of the electronic device 102, the computer-readable media 1204 may be an example of non-transitory computer storage media and may include volatile and nonvolatile memory and/or removable and non-removable media implemented in any type of technology for storage of information such as computer-readable instructions, data structures, program modules or other data. Such computer-readable media includes, but is not limited to, RAM, ROM, EEPROM, flash memory or other computer-readable media technology, CD-ROM, digital versatile disks (DVD) or other optical storage, magnetic cassettes, magnetic tape, solid state storage, magnetic disk storage, RAID storage systems, storage arrays, network attached storage, storage area networks, cloud storage, or any other medium that can be used to store information and which can be accessed by the processor 1202 directly or through another computing device. Accordingly, the computer-readable media 1204 may be computer-readable media able to maintain instructions, modules or components executable by the processor 1202.

The computer-readable media 1204 may be used to store any number of functional components that are executable by the processor 1202. In some implementations, these functional components comprise instructions or programs that are executable by the processor 1202 and that, when executed, implement operational logic for performing the actions attributed above to the electronic device 102. Functional components of the electronic device 102 stored in the computer-readable media 1204 may include the digital work display module 122 and the game module 126, as described above, which may be executed on the processor 1202 for displaying the digital works 220-224 generating games from the supplemental information instances 228-232 for the digital works 220-224, respectively. Additional functional components stored in the computer-readable media 1204 may include the provider interaction module 1112, executable by the processor 1202 for obtaining the digital works 220-224 and the corresponding supplemental information instances 228-232 from the digital work provider site 1102, and the supplemental information display module 1108 for displaying supplemental information in response to a user selection of an object from a digital work. Other functional components may include an operating system and user interface module 1206 for controlling and managing various functions of the electronic device 102. Depending on the type of the electronic device 102, the computer-readable media 1204 may also optionally include other functional components, such as other modules 1208, which may include applications, programs, drivers and so forth.

The computer-readable media 1204 may also store data, data structures, and the like that are used by the functional components. For example, data stored by the computer-readable media 1204 may include the digital work library 218, containing the digital works 220-224, and the supplemental information instances 226, containing the supplemental information instances 228-232. The electronic device 102 may also include other data, which may include, for example, data used by the provider interaction module 1112, the operating system and user interface 1206, and the other modules 1208. Further, the electronic device 102 may include many other logical, programmatic and physical components, of which those described are merely examples that are related to the discussion herein.

FIG. 12 further illustrates the display 204, which may be passive, emissive or any other form of display. In one implementation, the display uses electronic paper (ePaper) display technology, which is bi-stable, meaning that it is capable of holding text or other rendered images even when very little or no power is supplied to the display. Some examples of suitable ePaper displays that may be used with the implementations described herein include bi-stable LCDs, MEMS, cholesteric, pigmented electrophoretic, and others. In other implementations, or for other types of devices, the display 204 may be an active display such as a liquid crystal display, plasma display, light emitting diode display, organic light emitting diode display, and so forth. These displays may comprise drive electronics, such as a display drive matrix configured to affect individual pixels within the display 204. Additionally, in some implementations, the display 204 may be a 3D display capable of providing a 3D image. For example, the display 204 may produce a 3D image by providing alternating left-eye and right-eye images with or without the use of shuttering or filtering eyeglasses. Accordingly, in some implementations, the visual representations and other user interface components herein may be rendered in 3D.

One or more communication interfaces 1210 may support both wired and wireless connection to various networks, such as cellular networks, radio, WiFi networks, short-range or near-field networks (e.g., Bluetooth®), infrared signals, local area networks, wide area networks, the Internet, and so forth. For example, the communication interface 1210 may allow a user of the electronic device 102 to access the World Wide Web, download digital works and supplemental information from the digital work provider site 1102, access supplemental online content, such as a from a website or other network location, and the like. The communication interface 1210 may further allow a user to access storage on another device, such as a user's computing device, a network attached storage device, or the like.

The electronic device 102 may further be equipped with various other input/output (I/O) components 1212. Such I/O components may include a touchscreen and various user controls (e.g., buttons, a joystick, a keyboard, a mouse, etc.), speakers, a microphone, a camera, connection ports, and so forth. For example, the operating system 1206 of the electronic device 102 may include suitable drivers configured to accept input from a keypad, keyboard, or other user controls and devices included as the I/O components 1212. For instance, the user controls may include page turning buttons, navigational keys, a power on/off button, selection keys, and so on. Additionally, the electronic device 102 may include various other components that are not shown, examples of which include removable storage, a power source, such as a battery and power control unit, a global positioning system (GPS) device, a PC Card component, and so forth.

Example Computing Devices

Figure 13:
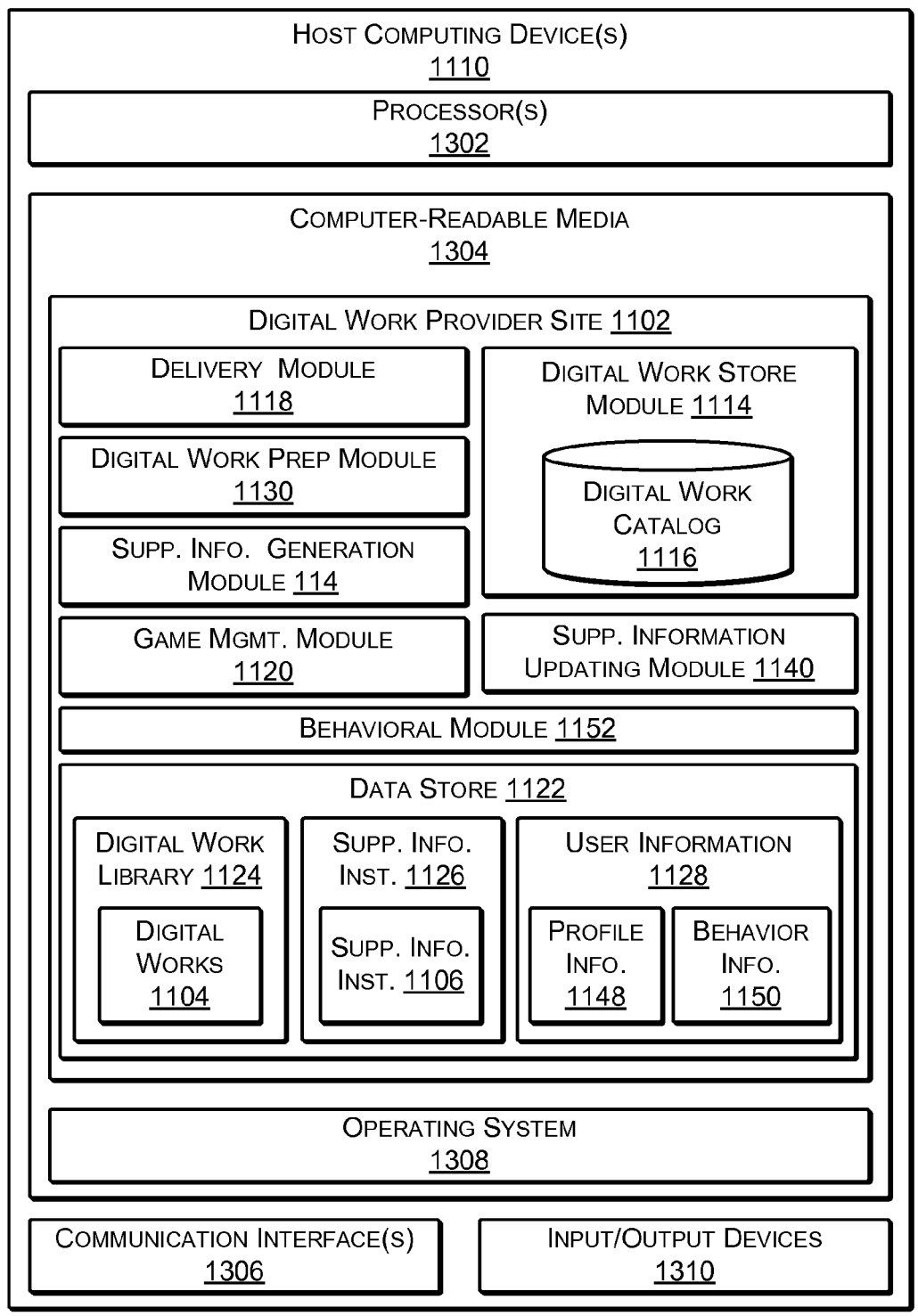
FIG. 13 illustrates select components of one or more example host computing devices of a digital work provider according to some implementations.

FIG. 13 illustrates select components of one or more host computing devices 1110 that may be used to implement the functionality of the digital work provider site 1102 according to some implementations. The digital work provider site 1102 may be hosted on one or more servers or other types of computing devices that may be embodied in any number of ways. For instance, in the case of a server, the digital work provider site 1102 may be implemented on a single server, a cluster of servers, a server farm or data center, a cloud hosted computing service, and so forth, although other computer architectures (e.g., a mainframe architecture) may also be used. Further, while the figures illustrate the components of the digital work provider site 1102 as being present in a single location, it is to be appreciated that these components may be distributed across different computing devices and locations in any manner. Generally, the digital work provider site 1102 may be implemented by one or more computing devices, with the various functionality described above distributed in various ways across the different computing devices. The computing devices may be located together or separately, and organized, for example, as virtual servers, server banks and/or server farms. The described functionality may be provided by the servers of a single entity or enterprise, or may be provided by the servers and/or services of multiple entities or enterprises.

As illustrated in FIG. 13, an example host computing device 1110 includes one or more processors 1302, one or more computer-readable media 1304, and one or more communication interfaces 1306. The processor(s) 1302 may be a single processing unit or a number of processing units, and may include single or multiple computing units or multiple cores. The processor(s) 1302 can be configured to fetch and execute computer-readable instructions stored in the computer-readable media 1304 or other computer-readable media.

The computer-readable media 1304 may include volatile and nonvolatile memory and/or removable and non-removable media implemented in any type of technology for storage of information, such as computer-readable instructions, data structures, program modules or other data. Such computer-readable media includes, but is not limited to, RAM, ROM, EEPROM, flash memory or other memory technology, CD-ROM, digital versatile disks (DVD) or other optical storage, magnetic cassettes, magnetic tape, solid state storage, magnetic disk storage, RAID storage systems, storage arrays, network attached storage, storage area networks, cloud storage, or any other medium that can be used to store the desired information and that can be accessed by a computing device. Depending on the configuration of the computing device 1110, the computer-readable media 1304 may be a type of computer-readable storage media and may be a non-transitory storage media.

The computer-readable media 1304 may be used to store any number of functional components that are executable by the processors 1302. In many implementations, these functional components comprise instructions or programs that are executable by the processors 1302 and that, when executed, implement operational logic for performing the actions attributed above to the digital work provider site 1102. Functional components of the digital work provider site 1102 that may be executed on the processors 1302 for implementing the various functions and features related to providing digital works and supplemental information, as described herein, include the digital work store module 1114, the delivery module 1118, the digital work preparation module 1130, the supplemental information generation module 114, and the supplemental information updating module 1140. Additional functional components stored in the computer-readable media 1304 may include the game management module 1120, the behavioral module 1152, and an operating system 1308 for controlling and managing various functions of the host computing device(s) 1110.

In addition, the computer-readable media 1304 may include, or the host computing device(s) 1110 may access, the data store(s) 1122, which may include the digital work library 1124, including the digital works 1104, the supplemental information instances 1126, including the supplemental information instance 1106, and the user information 1128, including the profile information 1148 and the behavior information 1150. In addition, the computer-readable media 1304 may store or the host computing devices(s) 1110 may access the digital work catalog 1116 used by the digital work store module 1114. The host computing device(s) 1110 may also include many other logical, programmatic and physical components, of which those described above are merely examples that are related to the discussion herein.

The communication interface(s) 1306 may include one or more interfaces and hardware components for enabling communication with various other devices, such as the electronic devices 102, over the network(s) 108. For example, communication interface(s) 1306 may facilitate communication through one or more of the Internet, cable networks, cellular networks, wireless networks (e.g., Wi-Fi, cellular) and wired networks. Various different approaches to implementations described herein can be implemented in various environments. For instance, the network(s) 108 may include any appropriate network, including an intranet, the Internet, a cellular network, a LAN, WAN, VPN or any other network or combination thereof. Components used for such a system can depend at least in part upon the type of network and/or environment selected. Protocols and components for communicating via such networks are well known and will not be discussed herein in detail.

Host computing device(s) 1110 may further be equipped with various input/output devices 1310. Such I/O devices 1310 may include a display, various user interface controls (e.g., buttons, mouse, keyboard, touch screen, etc.), audio speakers, connection ports and so forth.

Various instructions, methods and techniques described herein may be considered in the general context of computer-executable instructions, such as program modules stored on computer storage media and executed by the processors herein. Generally, program modules include routines, programs, objects, components, data structures, etc., for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed as desired in various implementations. An implementation of these modules and techniques may be stored on computer storage media or transmitted across some form of communication media.

Example Processes

Figure 14:
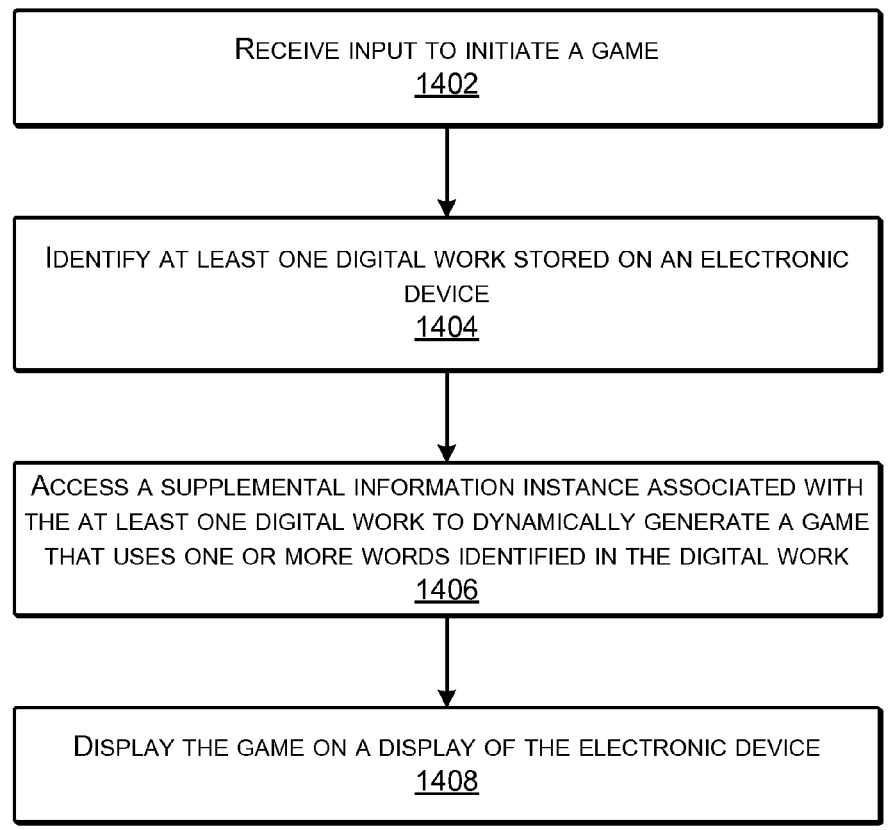
FIG. 14 is a flow diagram illustrating an example process executed on an electronic device for providing a game in connection with a digital work according to some implementations.
Figure 15:
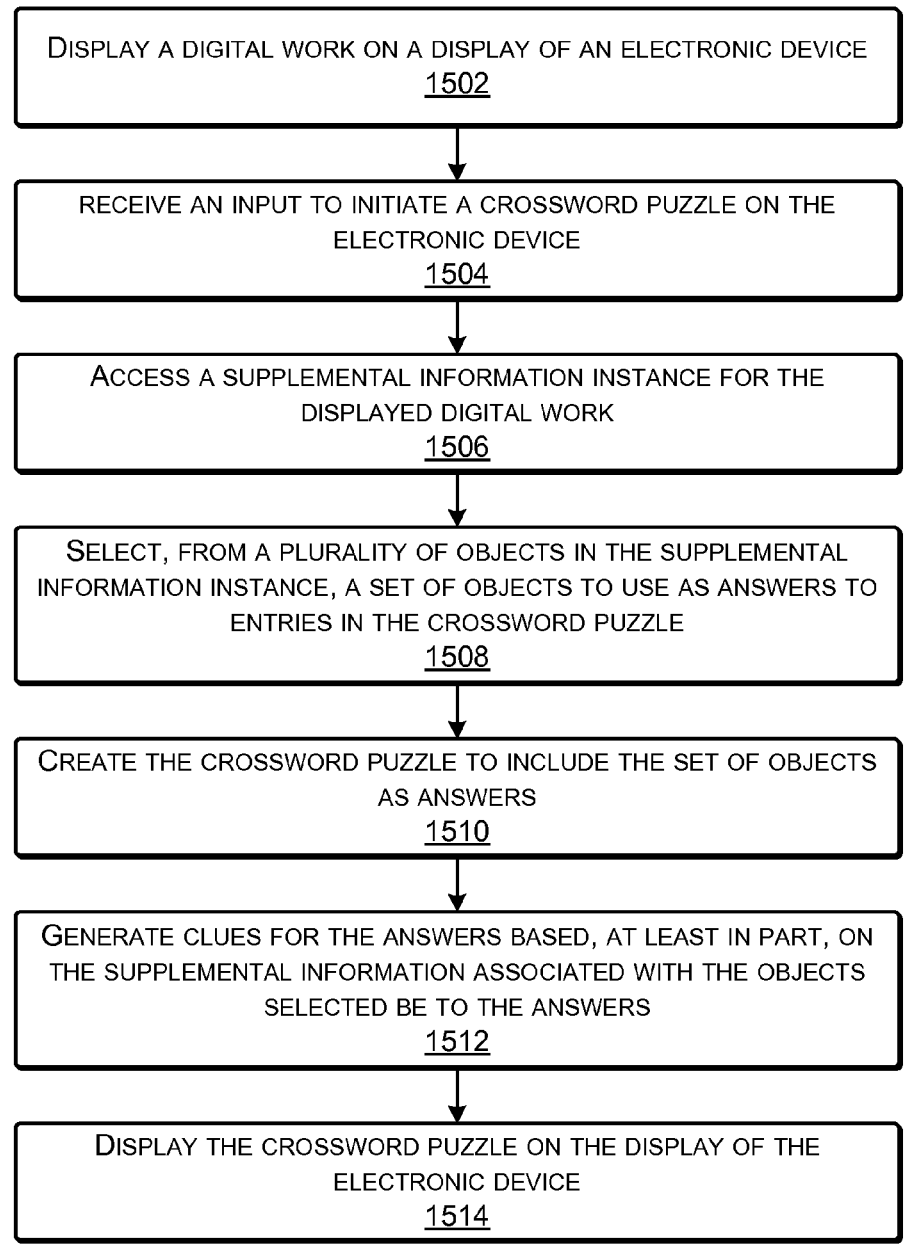
FIG. 15 is a flow diagram illustrating an example process executed on an electronic device for providing a crossword puzzle in connection with a digital work according to some implementations.
Figure 16:
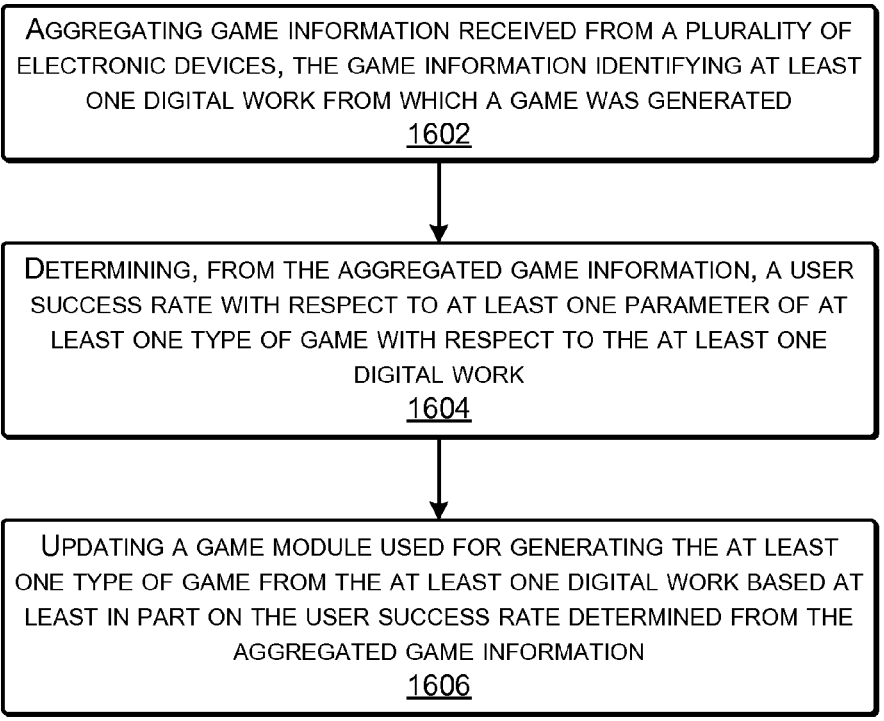
FIG. 16 is a flow diagram illustrating an example process for using collected game information to refine game generation according to some implementations.

FIGS. 14-16 illustrate example processes for generating a game in connection with a digital work according to some implementations. These processes are illustrated as a collection of blocks in logical flow diagrams, which represent a sequence of operations, some or all of which can be implemented in hardware, software or a combination thereof. In the context of software, the blocks represent computer-executable instructions stored on one or more computer-readable media that, when executed by one or more processors, perform the recited operations. Generally, computer-executable instructions include routines, programs, objects, components, data structures and the like that perform particular functions or implement particular abstract data types. The order in which the operations are described should not be construed as a limitation. Any number of the described blocks can be combined in any order and/or in parallel to implement the process, or alternative processes, and not all of the blocks need be executed. For discussion purposes, the processes are described with reference to the architectures, environments and frameworks described in the examples herein, although the processes may be implemented in a wide variety of other architectures, environments or frameworks.

FIG. 14 is a flow diagram illustrating an example process 1400 that may be executed by the electronic device 102 for generating a game in connection with a digital work according to some implementations.

At 1402, the device receives an input to initiate a game. In some examples, the device may receive the input to initiate the game while a particular digital work is being presented or displayed on the device. In other examples, the game may be initiated by selection and execution of a standalone game application without any digital work being displayed.

At 1404, the game module identifies at least one digital work stored on the electronic device to be used for generating the game. For example, in the case that the game module is initiated from within an open digital work, the game module may default to using the open digital work for generating the game. Alternatively, as another example, the user may select one or more digital works to be used for generating the game.

At 1406, the game module accesses a supplemental information instance associated with the at least one digital work to dynamically generate a game that uses one or more words identified in the digital work. For example, the supplemental information instance associated with the digital work may include a plurality of objects previously identified in the digital work as being likely to be of interest to a reader or consumer of the digital work. Accordingly, depending on the type of game to be played, the game module may select one or more of the objects from the supplemental information for use in generating the game.

At 1408, the game module generates and displays the game on the electronic device. For example, the game module may display the game in a game interface as a pop-up or overlay on top of a presentation of the digital work. In other examples, the game module may display the game in a separate full-screen interface regardless of whether a digital work is displayed or not.

FIG. 15 is a flow diagram illustrating an example process 1500 that may be executed by the electronic device 102 for generating a crossword puzzle game in connection with a digital work according to some implementations herein.

At 1502, the electronic device displays a digital work on a display. For example, a user may activate a reader or player application for displaying a digital work on the display of the electronic device.

At 1504, the electronic device may receive an input to initiate generation of a crossword puzzle game on the electronic device. For example, a game module may be initiated based on a received user input to initiate playing a crossword puzzle game.

At 1506, the game module may access the supplemental information for the display digital work. For example, the game module may default to generating a crossword puzzle from a digital work that is currently displayed on the electronic device. In other examples, however, the game module may request that the user select one or more digital works for generating the crossword puzzle. Additionally, in the case that there is no digital work open on the electronic device, the game module may also request that the user select one or more digital works, or the game module may select one or more digital works most recently accessed by the user. Thus, the game module may access the supplemental information instance(s) corresponding to one or more selected digital works.

At 1508, the game module selects, from a plurality of objects in the supplemental information instance(s), a set of object to use as answers to entries in the crossword puzzle. For example, the game module may sort the objects in the supplemental information instance based on a frequency of occurrence in the digital work in order to control a level of difficulty of the crossword puzzle when selecting objects to include in the crossword puzzle.

At 1510, the game module creates the crossword puzzle layout to include the set of objects selected to be the answers. For example, the game module may control the layout of the crossword puzzle to control the level of difficulty by controlling how many words of the selected answers cross one another.

At 1512, the game module generates clues for the answers based at least in part on the supplemental information associated with the objects selected to be the answers. For example, the game module may refer to the supplemental information instance to access supplemental information for each of the selected objects. The game module may obtain the clues from various sources, such as from prestored content associated with a selected object, a URL or other network resource locator associated with the selected object, and/or excerpts from the digital work associated with the locations identified for each occurrence of the selected object.

At 1514, the game module displays the crossword puzzle on the display of the electronic device. For example, the game module may display the crossword puzzle in a game interface displayed on the electronic device such as in a pop-up or overlay displayed over the presentation of a digital work. In other examples, the game may be displayed in a separate full-screen window.

FIG. 16 is a flow diagram illustrating an example process 1600 for using collected game information for refining game generation in connection with one or more digital works according to some implementations.

At 1602, the game management module aggregates game information received from a plurality of electronic devices. For instance, the game information may identify at least one digital work from which a game was generated. For example, the game management module may receive and aggregate game information from a large number of users and user electronic devices. The game information may include the amount of time needed to complete a game, identification of answers, clues or hints that were successful or unsuccessful in being used to complete the game, and so forth.

At 1604, the game management module, or a behavioral module associated with the game management module, determines, from the aggregated game information, a user success rate with respect to at least one parameter of at least one type of game with respect to the at least one digital work. For example, the module may determine the user success rate with respect to a plurality of users for at least one of: one or more clues generated for the type of game in connection with the particular digital work; or one or more answers generated for the type of game in connection with the particular digital work. Thus, in the case of a crossword puzzle, the module may determine which clues or hints enabled a user to successfully solve the puzzle, while other clues or hints may be determined to be too difficult for most users or otherwise not conducive to solving the puzzle. Similarly, with respect to answers, the aggregated information may indicate that certain answers or types of answers are too obscure to be figured out by most users.

At 1606, the game management module may update a game module used for generating the at least one type of game from the at least one digital work based at least in part on the user success rate determined from the aggregated game information. For example, the game management module may update the game module(s) on the electronic device(s) to improve control over the level of difficulty of game generated by the game module(s). Thus, based on the user success rates determined from the aggregated information, the game module may be updated to identify particular clues and answers for a particular digital work. Further, the game module may be updated to select particular types of clues and particular types of answers to achieve a desired level of difficulty.

The example processes described herein are only examples of processes provided for discussion purposes. Numerous other variations will be apparent to those of skill in the art in light of the disclosure herein. Further, while the disclosure herein sets forth several examples of suitable frameworks, architectures and environments for executing the processes, implementations herein are not limited to the particular examples shown and discussed.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The invention claimed is:

1. One or more non-transitory computer-readable media maintaining instructions executable by one or more processors to perform operations comprising:
  receiving, by an electronic device, a digital work from a digital content server;
  receiving, by the electronic device, a supplemental information instance external to the digital work;
  storing, by the electronic device, the digital work and the supplemental information instance locally on a memory of the electronic device;
  displaying, by the electronic device, the digital work on a display of the electronic device;
  receiving, by the electronic device, an input to initiate a crossword puzzle on the electronic device;
  accessing, by the electronic device, the supplemental information instance external to the digital work and stored on the memory of the electronic device, the supplemental information instance containing at least a first object identified in the digital work having supplemental information associated therewith, the supplemental information including at least location information associated with the first object and a link to a network resource associated with the first object;
  selecting, by the electronic device, the first object to use as an answer to an entry in the crossword puzzle;
  creating, by the electronic device, the crossword puzzle to include the first object as a first answer in the crossword puzzle;
  generating, by the electronic device, a clue for the first answer in the crossword puzzle, generating the clue comprising:
    obtaining, via the link within the supplemental information and from the network resource, content associated with the first object; and
    generating the clue based at least in part on the content associated with the first object; and
  displaying, by the electronic device, the crossword puzzle on the display.

2. The one or more non-transitory computer-readable media as recited in claim 1, wherein selecting the first object further comprises selecting the first object based at least in part on a frequency of occurrence of the first object in the digital work.

3. The one or more non-transitory computer-readable media as recited in claim 1, wherein the first object is at least one of:
- a character in the digital work;
- a person mentioned in the digital work;
- a place mentioned in the digital work;
- a thing mentioned in the digital work;
- an interaction between characters in the digital work;
- an organization mentioned in the digital work;
- a relationship between characters in the digital work;
- a popular highlight in the digital work;
- a theme in the digital work;
- a scene in the digital work;
- an event mentioned in the digital work;
- a phrase used in the digital work;
- a topic mentioned in the digital work;
- a citation provided in the digital work; or
- a time period associated with the digital work.

4. A method comprising:
under control of one or more processors configured with executable instructions,
receiving, by an electronic device, a supplemental information instance associated with at least one digital work stored in a memory of the electronic device;
storing, by the electronic device, the supplemental information instance in the memory of the electronic device;
identifying, by the electronic device, the at least one digital work stored in the computer-readable medium on the electronic device;
accessing, by the electronic device, supplemental information located separate from but associated with the at least one digital work, the supplemental information including at least location information associated with one or more words in the at least one digital work and a link to a network resource associated with the one or more words;
generating, by the electronic device, a game that uses the one or more words, the generating comprising:
obtaining, by the electronic device and via the link within the supplemental information and from the network resource, content associated with the one or more words, and
generating, by the electronic device, the game based at least in part on the content; and
displaying, by the electronic device, the game on a display.

5. The method as recited in claim 4, wherein the location information includes a location in the at least one digital work of each occurrence of the one or more words.

6. The method as recited in claim 4, generating the game further comprising generating at least one clue for the game from the supplemental information associated with at least one word of the one or more words.

7. The method as recited in claim 6, wherein generating the at least one clue further comprises generating the at least one clue from the content associated with the one or more words.

8. The method as recited in claim 6, wherein generating the at least one clue further comprises generating the at least one clue from a portion of text of the at least one digital work that is proximate to a location in the at least one digital work of an occurrence of the at least one word corresponding to the clue.

9. The method as recited in claim 8, wherein generating the at least one clue from a portion of text of the digital work that is proximate to a location in the digital work of an occurrence of the at least one word corresponding to the clue further comprises:
determining locations of one or more of highlights or annotations made to the at least one digital work; and
generating the at least one clue from a location in the at least one digital work that is proximate to the location of at least one of the highlights or annotations.

10. The method as recited in claim 4, wherein the game is generated in connection with the at least one digital work based, at least in part, on the game being initiated during the displaying of the at least one digital work.

11. The method as recited in claim 4, wherein the game is generated in connection with a plurality of digital works, the game including different words contained in different respective digital works of the plurality of digital works.

12. The method as recited in claim 11, further comprising providing a user interface to enable selection of at least one digital work, or a portion thereof, of the plurality of digital works that the game is generated in connection with.

13. The method as recited in claim 4, wherein the game is one of:
- a crossword puzzle;
- an anagram game;
- a word-find game; or
- a hangman game.

14. The method as recited in claim 4, further comprising:
saving progress in the game at a saved location when closing the game; and
sending first game information associated with the game to a computing device over a network for aggregating with second game information associated with the game from other electronic devices.

15. The method as recited in claim 14, further comprising:
receiving the first game information from the computing device at a different electronic device; and
opening the game on the different electronic device to resume the game at the saved location on the different electronic device.

16. The method as recited in claim 14, further comprising receiving, from the computing device, an update to a module that generated the game to generate an updated module, the update based at least in part on aggregated game information provided to the computing device by a plurality of electronic devices.

17. The method as recited in claim 16, further comprising generating a new game using the updated module, the updated module generating at least one of a clue or an answer for the new game based, at least in part, on a success rate of one or more users with respect to the at least one clue or answer.

18. The method as recited in claim 4, further comprising using at least a portion of an image from the at least one digital work as at least one of an answer or a clue in the game.

19. An electronic device comprising:
one or more processors; and
one or more computer-readable media, wherein the one or more computer-readable media includes executable instructions that, when executed by the one or more processors, cause the one or more processors to perform operations including:
receiving, by the electronic device and from a digital content server, supplemental information associated with a digital work, the supplemental information including, for at least a first object and a second object identified in the digital work, a location in the digital work of at least one occurrence of at least one of the first object and the second object and a link to a network resource associated with the second object;

storing, by the electronic device, the supplemental information in the one or more computer-readable media;

detecting, by the electronic device, an input to initiate a game;

generating, by the electronic device, the game using the first object and the second object as at least two answers;

generating, by the electronic device, a first clue for the game, generating the first clue comprising:
  selecting a portion of text of the digital work, the portion of the text being selected at least partly based on aggregated game information regarding success rates for clues drawn from the portion of text; and
  generating the first clue for the game from the portion of the text of the digital work; and generating a second clue for the game, generating the second clue comprising:
  accessing the supplemental information from the one or more computer-readable media;
  obtaining, via the link within the supplemental information and from the network resource, content associated with the one or more words, and
  generating the second clue based at least in part on the content.

20. The device as recited in claim 19, wherein generating the first clue further comprises generating based, at least in part, on the supplemental information, the first clue related to the at least one answer.

21. The device as recited in claim 19, wherein generating the first clue further comprises deriving the first clue from content related to the at least one object, the content obtained from a network accessible resource.

22. The device as recited in claim 19, wherein the game is one of:
  a crossword puzzle;
  an anagram game;
  a word find game; or
  a hangman game.

23. The device as recited in claim 19, wherein generating the game using the at least one object as at least one answer further comprises:
  determining a point of furthest progression in the digital work; and
  selecting the first object and the second object to use for generating the game based, at least in part, on the first object and the second object having at least one occurrence in the digital work prior to the point of furthest progression.

24. The device as recited in claim 19, wherein generating the game using the first object and the second object as at least one answer further comprises:

generating the game using the first object and the second object from the digital work as the at least two answers; and
using a third object from a different digital work as at least one other answer.

25. A method comprising:
under control of one or more processors configured with executable instructions,
aggregating, by an electronic device, game information received from a plurality of electronic devices to generate aggregated game information, the game information being associated with one of a game clue or a game answer and identifying at least a first digital work from which a game was generated;
determining, by the electronic device and based at least in part on the aggregated game information, a difficulty level of an individual one of the game clue or the game answer; and
sending, by the electronic device and to a first electronic device of the plurality of electronic devices, supplemental information configured to be stored in an instance external to the first digital work and used for generating one of the game clue or the game answer, wherein the supplemental information includes a link to a network resource associated with an object in the first digital work.

26. The method as recited in claim 25, wherein the supplemental information is further configured to control a difficulty of the one of the game clue or game answer.

27. The one or more non-transitory computer-readable media as recited in claim 1, wherein the input is a first input, the crossword puzzle is a first crossword puzzle, the first object is selected based at least in part on the first object occurring at a second location prior to a first location within the digital work to which a user has progressed, the operations further comprising:
receiving, by the electronic device, a second input to initiate a second crossword puzzle on the electronic device;
identifying, by the electronic device, a third location within the digital work to which a user has progressed, the third location being different than the first location and the second location; and
selecting, by the electronic device, a second object to use as an answer to an entry in the second crossword puzzle, wherein the second object is selected based at least in part on the second object occurring at a fourth location prior to a third location within the digital work to which the user has progressed.

28. The one or more non-transitory computer-readable media as recited in claim 1, wherein the link is a first link, and the operations further comprising:
receiving a second link to a different network resource associated with the first object; and
storing the second link in the supplemental information instance in association with the object.

* * * * *